(12) United States Patent
Lux et al.

(10) Patent No.: US 10,456,946 B2
(45) Date of Patent: Oct. 29, 2019

(54) CUTTING MEMBER OF A SAW CHAIN, SAW CHAIN HAVING A CUTTING MEMBER AND FILES FOR FILING A CUTTING TOOTH OF A SAW CHAIN

(71) Applicant: Andreas Stihl AG & Co. KG, Waiblingen (DE)

(72) Inventors: Thomas Lux, Welzheim (DE); Friedrich Hollmeier, Rudersberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/959,103

(22) Filed: Apr. 20, 2018

(65) Prior Publication Data

US 2018/0304490 A1    Oct. 25, 2018

(30) Foreign Application Priority Data

Apr. 20, 2017    (EP) .................................... 17400020

(51) Int. Cl.
*B27B 33/14* (2006.01)
*B23D 63/16* (2006.01)
*B23D 63/10* (2006.01)

(52) U.S. Cl.
CPC .......... *B27B 33/142* (2013.01); *B23D 63/162* (2013.01); *B23D 63/10* (2013.01)

(58) Field of Classification Search
CPC ...... B27B 33/142; B23D 63/162; B23D 63/10
See application file for complete search history.

(56) References Cited

U.S. PATENT DOCUMENTS

| 3,144,891 | A | * | 8/1964 | Carlton | B27B 33/142 83/834 |
|---|---|---|---|---|---|
| 3,339,254 | A | | 9/1967 | Anderson et al. | |
| 3,469,610 | A | * | 9/1969 | Silvon | B23D 63/162 76/80.5 |
| 3,581,785 | A | * | 6/1971 | Neumeier | B27B 33/14 83/174 |
| 3,696,692 | A | * | 10/1972 | Baranowski | B23D 65/00 76/112 |
| 3,727,507 | A | * | 4/1973 | Weiss | B27B 33/142 83/831 |

(Continued)

FOREIGN PATENT DOCUMENTS

| CA | 2054617 A1 | 5/1993 |
|---|---|---|
| EP | 0292241 A1 | 11/1988 |

*Primary Examiner* — Sean M Michalski
(74) *Attorney, Agent, or Firm* — Walter Ottesen, P.A.

(57) ABSTRACT

A cutting member of a saw chain has a cutting tooth and a cutting surface having at least one cutting edge. In a side view, looking in a sharpening direction, a first line connects an intersection between an upper edge of a roof section and the cutting surface to an intersection between an imaginary line, which extends parallel to the upper edge, and the cutting surface. A second line connects an intersection between the upper edge and an imaginary displacement of the cutting surface parallel to the contact surface at a position in which a tooth tip of the cutting tooth lies perpendicular to the running direction above a longitudinal center axis of the rearward bearing point, to a point of intersection between the imaginary line and the imaginary displacement of the cutting surface. The contact surface is aligned such that the first and second line extend in parallel.

13 Claims, 11 Drawing Sheets

(56) References Cited

U.S. PATENT DOCUMENTS

| | | | | |
|---|---|---|---|---|
| 3,856,358 A * | 12/1974 | Krekeler | B27B 33/14 299/82.1 |
| 4,008,640 A * | 2/1977 | Good | B27B 33/14 83/833 |
| 4,122,741 A * | 10/1978 | Engman | B27B 33/142 83/830 |
| 4,211,136 A * | 7/1980 | Geurian | B27B 33/14 83/830 |
| 4,271,738 A * | 6/1981 | DeAngelis | B23D 57/02 83/174 |
| 4,348,926 A * | 9/1982 | Dolata | B27B 33/142 76/80.5 |
| 4,463,630 A * | 8/1984 | Turner | B23D 63/166 76/41 |
| 4,535,667 A * | 8/1985 | Gibson | B23D 63/168 76/80.5 |
| 4,562,762 A * | 1/1986 | Dubler | B23D 65/00 83/734 |
| 4,567,803 A * | 2/1986 | Anderson | B27B 33/141 83/833 |
| 4,625,610 A * | 12/1986 | Petrovich | B27B 33/141 83/833 |
| 4,898,057 A * | 2/1990 | Hille | B27B 33/14 83/831 |
| 5,065,658 A * | 11/1991 | Ziegelmeyer | B23D 63/16 83/830 |
| 5,172,619 A * | 12/1992 | Kolve | B27B 33/142 83/13 |
| 5,666,871 A * | 9/1997 | Burrows | B23D 61/021 83/830 |
| 6,112,632 A * | 9/2000 | Buchholtz | B27B 33/141 83/830 |
| 6,308,606 B1 * | 10/2001 | Buchholtz | B27B 33/14 83/830 |
| 6,435,070 B1 * | 8/2002 | Weber | B23D 63/168 83/830 |
| 7,617,621 B1 * | 11/2009 | Schwede | B27B 33/142 37/465 |
| 8,256,335 B1 * | 9/2012 | Canon | B27B 33/14 30/381 |
| 9,272,440 B1 * | 3/2016 | Hutsell | B27B 33/142 |
| 2003/0126952 A1 * | 7/2003 | Duquet | B27B 33/145 76/112 |
| 2003/0192418 A1 * | 10/2003 | Mang | B27B 33/141 83/833 |
| 2008/0034938 A1 * | 2/2008 | Fuchs | B27B 33/14 83/830 |
| 2008/0072733 A1 * | 3/2008 | Schulz | B27B 33/141 83/834 |
| 2008/0110316 A1 * | 5/2008 | Harfst | B27B 33/142 83/830 |
| 2009/0107317 A1 * | 4/2009 | Kewes | B27B 33/142 83/831 |
| 2010/0005666 A1 * | 1/2010 | Seigneur | B27B 33/141 30/138 |
| 2011/0179652 A1 * | 7/2011 | Fohrenbach | B27B 33/141 30/383 |
| 2014/0123827 A1 * | 5/2014 | Fuchs | C04B 35/638 83/830 |
| 2014/0260875 A1 * | 9/2014 | Harfst | B23D 65/00 83/830 |
| 2015/0122102 A1 * | 5/2015 | Engelfried | B27B 33/142 83/788 |
| 2015/0183124 A1 * | 7/2015 | Schell | B27B 33/142 83/834 |
| 2016/0045964 A1 * | 2/2016 | Likidou | B27B 33/147 30/383 |
| 2016/0121511 A1 * | 5/2016 | Hutsell | B27B 33/142 83/834 |
| 2016/0136837 A1 * | 5/2016 | Szymanski | B27B 33/14 83/830 |

* cited by examiner

US 10,456,946 B2

CUTTING MEMBER OF A SAW CHAIN, SAW CHAIN HAVING A CUTTING MEMBER AND FILES FOR FILING A CUTTING TOOTH OF A SAW CHAIN

CROSS REFERENCE TO RELATED APPLICATION

This application claims priority of European patent application no. 17 400 020.8, filed Apr. 20, 2017, the entire content of which is incorporated herein by reference.

BACKGROUND OF THE INVENTION

CA 2,054,617 A1 discloses a cutting member of a saw chain which is to be re-sharpened using a grinding wheel. During resharpening there is a planar surface on a cutout between depth limiter and cutting tooth. The cutting surface formed on the cutting tooth has a cutting surface edge which in the resharpening state shown is arranged directly on the underside of the roof section of the cutting member. If the cutting tooth is re-sharpened further and at the same time the grinding wheel is moved parallel to the bearing position plane, the cutting surface edge creeps into the roof section.

If cutting members are re-sharpened by hand with a file, the operator must guide the file such that the cutting angle, that is, the angle about which the cutting surface on the roof section is inclined relative to the running direction, remains the same. At the same time, the operator must ensure when filing that he does not guide the file too far in the direction of the bearing position plane as this can result in weakening the cutting tooth in the region of the connection to the basic body of the cutting member. This is difficult in particular for inexperienced operators. In particular in the case of cutting members with a roof section which falls away to the rear, manual resharpening using a round file requires a good deal of skill as the file is to be guided not only in the horizontal direction but also in the vertical direction at the same time. Even small errors in the positioning of the round file give rise to a clear change in the cutting angle.

SUMMARY OF THE INVENTION

It is an object of the invention to provide a cutting member of a saw chain which is also able to be re-sharpened simply and correctly even by an inexperienced operator. Further objects of the invention include providing an easily re-sharpenable saw chain with a cutting member as well as a file for filing the cutting tooth of a saw chain which allows simple resharpening.

The object can, for example, be achieved by a cutting member of a saw chain. The cutting member includes: a cutting tooth; the cutting member defining a running direction and having a forward bearing point disposed at a forward position with respect to the running direction and a rearward bearing point disposed at a rearward position with respect to the running direction; a sharpened cutting surface at which at least one cutting edge is formed; a planar contact surface adjoining the cutting surface; the cutting tooth having a roof section at which one of the at least one cutting edges is formed; the roof section, when viewed in a side view of the cutting member with a viewing direction in a sharpening direction which runs parallel to the cutting surface and parallel to the contact surface, having a greatest thickness (i) measured perpendicular to the running direction; the roof section having an upper edge; the cutting member defining a first connecting line in the side view connecting a first point of intersection between the upper edge of the roof section and the cutting surface to a point of intersection between an imaginary line, which extends parallel to and at a distance (k) from the upper edge of the roof section, and the cutting surface; the cutting tooth having a tooth tip; the cutting member defining a second connecting line in the side view connecting a second point of intersection between the upper edge of the roof section and an imaginary displacement of the cutting surface parallel to the contact surface at a position in which the tooth tip lies perpendicular to the running direction above a longitudinal center axis of the rear bearing point, to a third point of intersection between the imaginary line and the imaginary displacement of the cutting surface; and, the contact surface being aligned such that the first connecting line and the second connecting line run parallel to each other.

With reference to the saw chain with a cutting member, the object can, for example, be achieved by a saw chain including: a cutting member having a cutting tooth; the cutting member defining a running direction and having a forward bearing point disposed at a forward position with respect to the running direction and a rearward bearing point disposed at a rearward position with respect to the running direction; the cutting member having a sharpened cutting surface at which at least one cutting edge is formed; the cutting member having a planar contact surface adjoining the cutting surface; the cutting tooth having a roof section at which one of the at least one cutting edges is formed; the roof section, when viewed in a side view of the cutting member with a viewing direction in a sharpening direction which runs parallel to the cutting surface and parallel to the contact surface, having a greatest thickness (i) measured perpendicular to the running direction; the roof section having an upper edge; the cutting member defining a first connecting line in the side view connecting a first point of intersection between the upper edge of the roof section and the cutting surface to a point of intersection between an imaginary line, which extends parallel to and at a distance (k) from the upper edge of the roof section, and the cutting surface; the cutting tooth having a tooth tip; the cutting member defining a second connecting line in the side view connecting a second point of intersection between the upper edge of the roof section and an imaginary displacement of the cutting surface parallel to the contact surface at a position in which the tooth tip lies perpendicular to the running direction above a longitudinal center axis of the rear bearing point, to a third point of intersection between the imaginary line and the imaginary displacement of the cutting surface; the contact surface being aligned such that the first connecting line and the second connecting line run parallel to each other; the forward bearing point and the rearward bearing point each defining a respective longitudinal center axis; the longitudinal axis of the forward bearing point and the longitudinal axis of the rearward bearing point conjointly defining a bearing point plane; the first connecting line and the bearing point plane conjointly defining an angle ($\varepsilon$) of less than 90° measured at a side facing away from the roof section; a connecting member having an upper side and arranged adjacent to the cutting member; the upper side of the connecting member and the bearing point plane defining a distance (f) between each other; the contact surface and the bearing point plane defining a distance (g) between each other; and, the distance (f) being smaller than the distance (g).

With reference to the file for filing a cutting tooth of a saw chain, the object can, for example, be achieved by a file for filing a saw tooth of a saw chain. The file includes: a file body defining a circumferential direction and a circumference; the file body, in a cross section, having a rough guide surface and a file surface adjoining the rough guide surface in the circumferential direction; and, the rough guide surface extending over at least 1/6 of the circumference in the cross section.

An aspect of the invention is intended for providing a contact surface or support surface on the cutting member on which it is possible to place a file for filing the cutting member. During the resharpening operation, the file can be guided along the contact surface. The contact surface gives, in a constructive manner, the direction in which the file has to be guided during filing, that is, the alignment of the file during resharpening and the direction in which the cutting tooth is re-sharpened. The cutting angle produced during resharpening is also specified as a result. The contact surface is aligned in such a manner, in this case, that the cutting angle in the roof section is maintained during resharpening. The cutting angle is to be maintained at least up to a resharpening position of the cutting tooth, at which the tooth tip of the cutting tooth is situated perpendicularly above a longitudinal center axis of the rear bearing position of the cutting member.

The cutting angle is measured at a point below the underside of the roof section between the tooth tip of the cutting tooth and the cutting surface. The cutting surface, in this case, can run in a curved or straight manner in the region in which the cutting angle is measured. The cutting angle is measured looking in a direction of sharpening which corresponds to the longitudinal center axis of a file abutting against the cutting surface. The sharpening direction lies parallel to the cutting surface and parallel to the contact surface. During resharpening, the cutting surface is displaced parallel to the contact surface as the file is guided along the contact surface. In order to ensure that the cutting angle is maintained, it is provided that in the side view looking in the direction of sharpening, a first connecting line on the cutting surface and a second connecting line on an imaginary displacement of the cutting surface extend parallel to one another. The imaginary displacement, in this case, is displaced parallel to the contact surface and corresponds to the position of the cutting surface after resharpening.

The first connecting line connects a first point of intersection, which is the point of intersection between an upper edge of the roof section and the cutting surface, to a second point of intersection, which is the point of intersection between an imaginary line and the cutting surface. The imaginary line extends parallel in the side view to the upper edge of the roof section and at a spacing which corresponds to at least the greatest thickness of the roof section. The imaginary line lies therefore on the cutting surface on the underside of the roof section or between the underside of the roof section and the bearing point plane. The imaginary line extends parallel to the upper edge of the roof section. The first point of intersection lies therefore on the upper edge and the second point of intersection on the underside of the roof section or below the underside of the roof section, both the first and the second points of intersection lying on the cutting surface. A second connecting line connects a third point of intersection and a fourth point of intersection together which are the corresponding points on the imaginary displacement of the cutting surface. The third point of intersection is the point of intersection between the upper edge of the roof section and the imaginary displacement of the cutting surface. The fourth point of intersection is the point of intersection between the imaginary line and the imaginary displacement of the cutting surface. The second connecting line connects the third point of intersection to the fourth point of intersection.

The contact surface is advantageously aligned such that resharpening of the cutting tooth is possible up to a position in which the tooth tip of the cutting tooth lies perpendicularly to the running direction behind the longitudinal center axis of the rear bearing point. To this end, it is advantageously provided that the distance between the imaginary line and the upper edge of the roof section is greater by at least 0.8 mm than the greatest thickness of the roof section. As a result, the cutting angle is maintained behind the longitudinal center axis of the rear bearing point even when resharpening the resharpening surface.

The contact surface is provided for the purpose of the operator being able to place a file onto the contact surface and guide it along the contact surface during filing. In order to achieve good guiding for the file as early as during the first resharpening, it is provided that the length of the contact surface, measured in the running direction, in the case of the non-re-sharpened cutting member is at least 3 mm. During resharpening, the length of the contact surface is increased corresponding to the path by which the file is guided along the contact surface in an opposite direction to the running direction.

In a preferred realization, the sharpened cutting surface has a first cutting surface section and a second cutting surface section which extends at an angle to the first cutting surface section. The sharpened cutting surface is the surface of the cutting member which is filed during resharpening. The first cutting surface section and the second cutting surface section are planar surfaces in a preferred manner. The second cutting surface section is realized at least in part on the roof section. The first cutting surface section and the second cutting surface section adjoin one another at a cutting surface edge. The cutting surface edge is arranged such that the distance between the cutting surface edge and the plane of the contact surface is no more than 0.2 mm greater than the smallest distance, measured perpendicularly to the plane of the contact surface, between the underside of the roof section and the plane of the contact surface. The distance, measured perpendicularly to the contact surface, is measured, in this case, respectively to the plane of the contact surface, that is, to the extension of the contact surface. In a particularly preferred configuration, the distance between the cutting surface edge and the plane of the contact surface is smaller than the smallest distance between the underside of the roof section and the plane of the contact surface or equal to the smallest distance between the underside of the roof section and the plane of the contact surface. As a result, the cutting tooth is able to be re-sharpened close to the end, located at the rear in the running direction, of the cutting tooth without the cutting surface edge creeping into the roof section during resharpening.

It is provided in a preferred manner for a cutting member which has two cutting surface sections which extend at an angle to one another and in particular are realized in a planar manner, that the contact surface encloses an angle of less than 5° with the bearing point plane in the direction of sharpening in the named side view. In a preferred configuration, the contact surface extends parallel to the bearing point plane.

In an alternative configuration it is provided that the cutting edge extends in a curved manner in the named side view. The cutting surface extends advantageously in a curved manner in the alternative configuration. In a preferred manner, the cutting edge extends in a curved manner about a center point at a radius, the distance between the contact surface to the center point being smaller than the radius. Such a curved cutting surface can be re-sharpened using a round file which has a flattened region on the circumference. It is provided in a preferred manner for a curved cutting edge that the contact surface encloses an angle of less than 5° with the upper edge of the roof section looking in the direction of sharpening in the named side view, preferably extending parallel to the upper edge of the roof section. As a result, the cutting angle is able to be maintained during resharpening in the case of a curved cutting edge. The contact surface, in this case, is aligned advantageously in such a manner that the contact surface is not moved too far into the basic body or too near to the bearing point plane in order to avoid weakening the connection between the cutting tooth and the basic body of the cutting member. The basic body of the cutting member is the region of the cutting member which includes the bearing points for connection to leading and trailing chain members. The basic body, in this case, is advantageously realized in a planar manner. The cutting tooth and a depth delimiter, which is provided where applicable, are not constituent parts of the basic body. The basic body extends advantageously up to the cutting tooth which is bent out of the plane of the basic body and where applicable up to a depth delimiter which is bent out of the plane of the basic body.

The longitudinal center axes of the bearing points lie advantageously in a bearing point plane. The first connecting line encloses with the bearing point plane advantageously an angle of less than 90°, in particular less than 80°, which is measured on the side remote from the roof section. This achieves a good cutting result. The contact surface encloses advantageously an angle of less than 5° with the bearing point plane looking in the running direction. The contact surface can therefore include a slight gradient transversely to the running direction. In a particularly preferred configuration, the contact surface extends parallel to the bearing point plane when looking in the running direction, that is, in the transverse direction. The contact surface is therefore inclined advantageously less than 5° in the transverse direction of the cutting member and extends in a particularly preferred configuration parallel to the bearing point plane.

A cutting edge realized on the roof section lies advantageously behind the contact surface in the running direction. The cutting edge is realized in particular on a top side of the roof section. The cutting edge, in this case, in a top view of the cutting member, lies in such a way that the cutting edge does not cover the contact surface. The cutting edge, which is advantageously realized on the end, arranged leading in the running direction, of the cutting tooth on the roof section, lies advantageously fully behind the contact surface in a side view looking in the direction of sharpening. A tooth tip, which lies behind the contact surface in the side view, is advantageously realized on the cutting edge. In the side view, the cutting edge and in particular the tooth tip lie advantageously vertically above the sharpened cutting surface, with reference to the bearing point plane, and at a horizontal distance from the contact surface. The distance, measured in the side view parallel to the bearing point plane, is advantageously between 0 and 5% of the height of the cutting tooth, measured perpendicularly to the contact surface between the contact surface and the tooth tip, in the non-re-sharpened state. The cutting edge is situated therefore, with reference to the height of the cutting tooth, in the non-re-sharpened state comparatively closely behind the contact surface and in the re-sharpened state advantageously behind the contact surface by a distance which is approximately a quarter of the tooth height. In the case of a cutting member where the cutting surface has two cutting surface sections which extend at an angle to one another, the tooth height is reduced as the degree of resharpening increases in the case of an angled alignment of the contact surface with respect to the upper edge of the roof section. The distance between the cutting edge and the contact surface, in particular between the tooth tip and the contact surface, measured parallel to the contact surface, increases from the non-sharpened state to the fully re-sharpened state advantageously to between 15% and 30%, in particular to between 20% and 25% of the tooth height, in the case of a cutting member where the cutting surface has two cutting surface sections which extend at an angle to one another.

A depth delimiter is advantageously arranged before the cutting tooth. A cutout is advantageously formed between the cutting tooth and the depth delimiter, the cutout being delimited at least in part in the direction of the bearing point plane by the contact surface. In a preferred configuration, the cutout is delimited fully in the direction of the bearing point plane by the contact surface such that the entire bottom of the cutout is formed by the contact surface. As a result, a very long contact surface and as a result secure guiding of a file during resharpening can be achieved in a simple manner. However, it can also be provided that the contact surface takes up only the region of the bottom of the cutout arranged directly before the cutting surface.

It is provided for a saw chain with a cutting member and a connecting member which is arranged next to the cutting member with reference to the running direction, that the connecting member has a top side and that the distance between the top side of the connecting member and the bearing point plane is smaller than the distance between the contact surface and the bearing point plane. As a result, the top side of the connecting member lies on the side, remote from the cutting surface, of the plane defined by the contact surface. The top side of the connecting member therefore does not project up to a file resting on the contact surface and does not impede the support of the file on the contact surface.

It is advantageously provided for a file for filing a cutting tooth of a saw chain that the file has an unhewn guide surface in cross section and at least one file surface which adjoins the guide surface in the circumferential direction. The file is able to be placed on the contact surface with the rough guide surface. The file surface, which adjoins the guide surface, is advantageously provided to abut against the cutting surface and to machine the cutting surface. As a result of the file surface directly adjoining the unhewn guide surface, and the guide surface itself being unhewn, it is possible to achieve in a simple manner that the contact surface is lengthened during resharpening and its alignment in this case is maintained. As a result, simple and precise resharpening can be made possible even for an inexperienced user. The width of the file, measured parallel to the guide surface, is enlarged advantageously in at least one region of the cross section of the file as the distance from the guide surface increases. As a result, an undercut can be produced in a simple manner on the cutting surface without the region of the connection between the cutting tooth and the basic body of the cutting member being unduly weakened. In a preferred manner, the distance between the file surface and a center plane of the file, which includes the longitudinal center axis of the file and extends perpendicularly to the guide surface, is increased in a first region of the file as the distance from the guide surface increases. It is advantageously provided in a second region of the file, the distance of which from the guide surface is greater than the distance of the first region from the guide surface, that the distance between the file surface and the center plane of the file is reduced as the distance from the guide surface increases. As a result, an undercut is generated on the cutting surface by the first region and the second region of the file.

An undercut is advantageously formed on the cutting tooth by the cutting surface. In an advantageous manner, the cutting surface has at least two normals which extend at an angle which differs from 0° and 90° both with respect to the contact surface and to the bearing point plane.

It is provided in particular for a cutting member which has two cutting surfaces which are aligned at an angle to one another and in a preferred manner extend in each case in a flat manner, that the file has a second file surface which adjoins the first file surface in the circumferential direction, the guide surface enclosing with the first file surface a first angle which is more than 90°, and the guide surface enclosing with the second file surface a second angle which is less than 90°. As a result, a comparatively wide connection between the cutting tooth and the basic body of the cutting member and at the same time an advantageous cutting angle can be achieved. In an advantageous manner, the first file surface forms the first region of the file and the second file surface forms the second region of the file.

It is advantageously provided for a file for filing a cutting tooth with a curved cutting edge that the file has a curved file surface which adjoins the guide surface in the circumferential direction. The guide surface and the file surface of the file are advantageously formed by different circumferential sections of the file.

In an advantageous manner, the first file surface and the second file surface have the same edge dimension, measured in the circumferential direction. In a preferred configuration, the file has two unhewn guide surfaces which are located opposite one another, two first file surfaces which are located opposite one another and two second file surfaces which are located opposite one another. As a result, the file is able to be utilized for resharpening in at least two orientations. In a particularly preferred configuration, the file has a hexagonal cross section. The width of the guide surface is advantageously at least 3 mm. As a result, the file is guided well by the guide surface.

An arrangement produced from a saw chain with a cutting member and a file is advantageously realized in such a manner that the angle between the contact surface and the first cutting surface section of the cutting member corresponds to the angle between the guide surface and the first filing surface of the file and that the angle between the contact surface and the second cutting surface section of the cutting member corresponds to the angle between the guide surface and the second filing surface of the file.

It is provided when resharpening a cutting member according to an aspect of the invention that the angle of the region of the cutting surface realized on the roof section remains largely unchanged from the initial state of the cutting member to the fully re-sharpened state. This is advantageously achieved as a result of the contact surface being produced in the correct orientation which matches the file as early as during the production of the cutting member and the file being moved along in a sliding manner exclusively on the contact surface located below it without any material being removed from the contact surface. This can be achieved as a result of the file having at least one unhewn contact surface which is provided to be supported on the contact surface.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
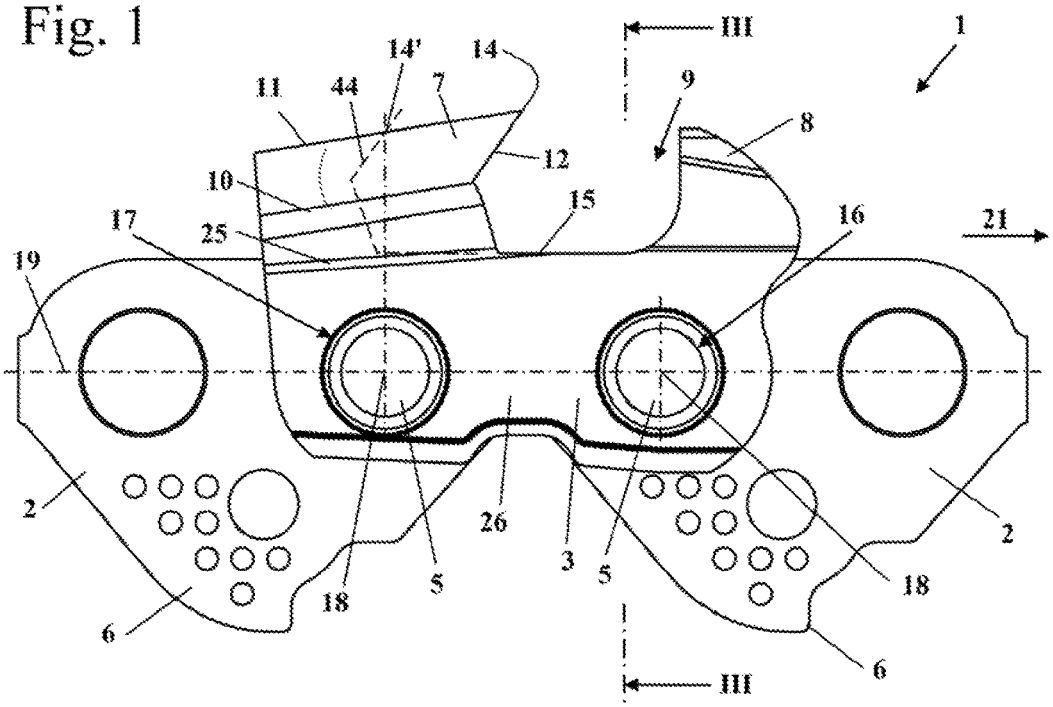
FIGS. 1 and 2 show side views of a detail of a saw chain.

FIG. 1 shows a side view of a section of a saw chain 1. The saw chain 1 has drive links 2 and cutting members 3 which are connected together in an articulated manner via connecting pins 5. The saw chain 1 is provided as a tool for a power saw in which the saw chain 1 is to be arranged circulating around a guide rail. In this case, drive bases 6 of the drive links 2 project into a guide groove of the guide rail and are driven by a drive pinion of the power saw. The saw chain 1, in this case, is moved in a running direction 21 circulating around the guide rail. The connecting pins 5 are arranged at bearing points of the cutting member 3. A front bearing point 16, which is arranged at the front in the running direction 21, and a rear bearing point 17, which is located at the rear in the running direction 21, are provided. The bearing points 16 and 17 each have longitudinal center axes 18 which form the pivot axes of the members of the saw chain 1. The longitudinal center axes 18 span a bearing point plane 19. The bearing points 16 and 17 are realized in a basic body 26 of the cutting member 3. In a preferred manner, the basic body 26 is realized flat. A depth limiter 8 and a cutting tooth 7, which can rise out of the plane of the basic body 26, are arranged on the basic body 26. Both the depth limiter 8 and the cutting tooth 7 are bent up out of the basic body plane in the embodiment. A cutout 9 which is delimited by a contact surface 15, which is described in more detail below, in the direction of the bearing point plane 19, is realized between the depth limiter 8 and the cutting tooth 7. The contact surface 15 extends almost over the entire bottom of the cutout 9 in the embodiment according to FIG. 1.

Figure 3:
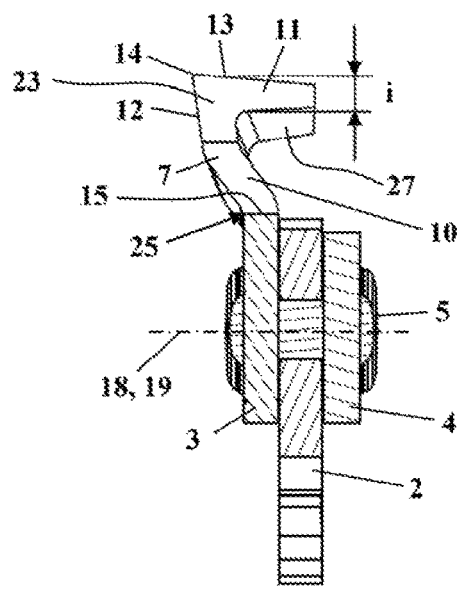
FIG. 3 shows a section along the line III-III in FIG. 1.

The cutting tooth 7 has a tooth root 25 which designates the region at which the cutting tooth 7 is connected to the basic body 26 of the cutting member 3. The cutting tooth 7 is bent up out of the plane of the basic body 26 at the tooth root 25. The cutting tooth 7 has a side section 10 at which the cutting tooth 7 extends approximately parallel to the plane of the basic body 26 at least in a section and a roof section 11 in which the cutting tooth 7 runs approximately parallel to the longitudinal center axes 18. The cutting tooth 7 is bent towards a center plane of the saw chain 1 at the roof section 11. As shown in FIG. 3, the roof section 11 extends at least in part over the drive link 2 which is adjacent to the cutting member 3.

A first cutting edge 12 realized on the side section 10 and a tooth tip 14 of the cutting tooth 7, both of which are provided for engagement in a workpiece, can be seen in FIG. 1. The tooth tip 14, in this case, is the region of the cutting tooth 7 which is located the furthest forward in the running direction 21. The tooth tip 14 can also be realized in a rounded or curved manner.

Figure 2:
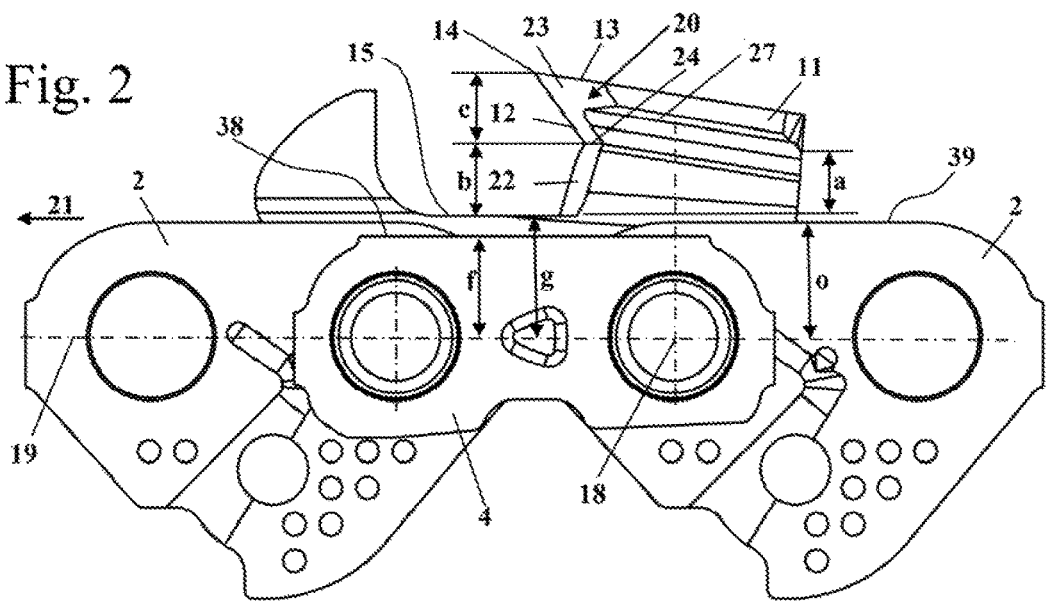

During resharpening of the cutting tooth 7, the operator places a file, which is supported on the cutting edge 12, onto the contact surface 15 and guides the file along the contact surface 15. FIG. 1 shows an imaginary displacement 44 of the cutting edge 12 where a tooth tip 14' lies perpendicularly above the longitudinal center axis 18 of the rear bearing point 17 with reference to the running direction 21. The imaginary displacement 44 corresponds to the contour of the cutting edge 12 in the side view shown when the cutting edge 12 is re-sharpened into the position shown. FIGS. 1 and 2, in this case, show side views of the saw chain 1 in the viewing direction of the longitudinal center axes 18.

As shown in FIG. 2, a second cutting edge 13 is realized on the top side of the roof section 11 remote from the bearing point plane 18. The first cutting edge 12 and the second cutting edge 13 are edges of a cutting surface 20 which runs at an angle to the side view shown. The cutting surface 20 has a first cutting surface section 22 which directly adjoins the contact surface 15 and a second cutting surface section 23 which extends on the roof section 11 and into the region of the side section 10 lying below it. The cutting edges 12 and 13 meet at the tooth tip 14.

The entire region between the contact surface 15 and the second cutting edge 13 is designated as the cutting surface 20. The cutting surface 20, in this case, does not have to come into full contact with a workpiece to be machined. In particular, the first cutting surface section 22 does not come into contact or only comes into contact partially with a workpiece to be machined. The first cutting edge 12 extends on the cutting surface 20 on one side of the cutting tooth 7 and is composed in the embodiment by two straight cutting edge sections. The first cutting edge 12 extends from the contact surface 15 to the tooth tip 14 and, in the embodiment, advantageously only comes into contact with the workpiece to be machined over part of its length. During resharpening, the first cutting edge 12 is re-sharpened over its entire length.

The cutting surface sections 22 and 23 are each realized in a flat manner and meet one another at a cutting surface edge 24. The cutting surface edge 24 runs parallel to the contact surface 15. In the embodiment, the cutting surface edge 24 is aligned parallel to the longitudinal center axes 18 of the bearing points 16 and 17 in the transverse direction of the saw chain 1. The roof section 11 has an underside 27 which faces the bearing point plane 19. The underside 27 is at a distance a to the contact surface 15, measured perpendicularly to the running direction 21. The distance a, in this case, is the smallest distance between the underside 27 and the contact surface 15 and is measured in the embodiment at the region of the roof section 11 located at the rear in the running direction 21. In the embodiment, the contact surface 15 runs parallel to the bearing point plane 19. The cutting surface edge 24 is at a distance b from the contact surface 15, which distance is measured perpendicularly to the running direction 21 and is smaller or slightly greater than the distance a. The distance b is advantageously greater than the distance a by less than 2 mm. In the non-sharpened state shown in FIGS. 1 and 2, the tooth tip 14 is at a distance c from the cutting surface edge 24, the distance c being measured perpendicularly to the running direction. In the embodiment, the distances b and c are approximately the same size in the non-sharpened state.

The contact surface 15 is at a distance g from the bearing point plane 19. A connecting member 4 is arranged on the side of the drive links 2 remote from the cutting member 3. The connecting member 4 has a top side 38 which is located on the same side of the bearing point plane 19 as the cutting tooth 7. The top side 38 is at a distance f from the bearing point plane 19, the distance f being smaller than the distance g. As a result, the top side 38 of the connecting member 4, which is arranged next to the cutting member 3, is located lower than the contact surface 15, that is, is offset in the direction toward the bearing point plane 15. The drive links 2 have a top side 39 which is at a distance o from the bearing point plane 19. In the embodiment, the distance o is also smaller than the distance g. In the embodiment, however, the distance o is slightly greater than the distance f. The distances f, g and o and the alignment of the contact surface 15 are chosen such that even in the fully re-sharpened state, a file for resharpening the cutting tooth 7 does not come into contact with the top side 38 of the connecting member 4 or the top side 39 of the drive link 2 when the file is guided on the contact surface 15.

As shown in FIG. 3, the connecting pin 5 projects through the cutting member 3, the connecting member 4 and the drive link 2 which is arranged centrally between the cutting member 3 and the connecting member 4. As is also shown in FIG. 3, in the sectional representation shown perpendicularly to the running direction 21, the contact surface 15 extends parallel to the bearing point plane 19. In the non-sharpened state, the contact surface 15 is arranged on the flat basic body 26 of the cutting member 3 and does not extend into the cutting tooth 7 which is bent up out of the basic body. As is also shown in FIG. 3, the roof section 11 has a greatest thickness i. The thickness i is measured perpendicularly to the bearing point plane 19. The thickness of the roof section 11 decreases from the side section 10 in the direction toward the free end of the roof section 11. In the embodiment, the thickness i is constant in the longitudinal direction of the roof section 11, that is, in the running direction 21. However, it can also be provided that the thickness i decreases or increases in the running direction 21.

Figure 4:
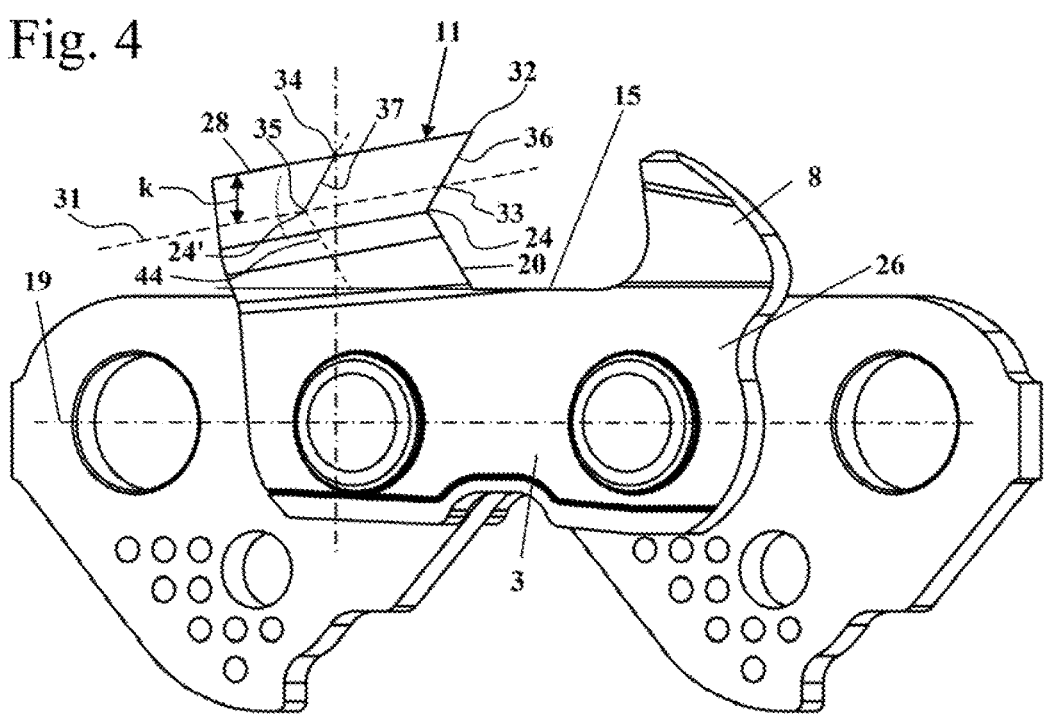
FIGS. 4 and 5 show perspective representations of the detail of the saw chain in a viewing direction which corresponds to the sharpening direction.
Figure 7:
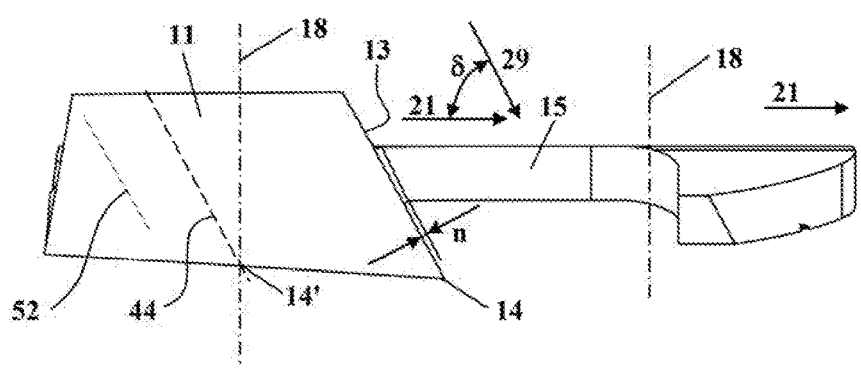
FIG. 7 shows a top view of the cutting member in the direction of the arrow VII in FIG. 6.

FIG. 4 shows a perspective representation of the section of the saw chain 1 shown in FIGS. 1 and 2 when looking in a sharpening direction 29 which is shown in FIG. 7. The sharpening direction 29 is the direction in which a file for resharpening the cutting tooth 7 is to be guided. The cutting surface 20 and the contact surface 15 are aligned parallel to the sharpening direction 29 and appear as lines in the side view in the sharpening direction 29. In the embodiment, the sharpening direction 29 is inclined with respect to the running direction 21 at an angle δ which is less than 90°. The angle δ is shown in FIG. 7 and is advantageously between 20° and 80°, in particular between 40° and 70°.

As shown in FIG. 4, in the side view looking in the sharpening direction 29, the roof section 11 has an upper edge 28. The upper edge 28 is the section of the roof section 11 which is located away from the bearing point plane 19 and appears as a line in the side view. An imaginary line 31, which runs parallel to the upper edge 28, is marked in FIG. 4. The imaginary line 31 is at a distance k from the upper edge 28, the distance k being measured perpendicularly to the bearing point plane 19 and being at least as great as the greatest thickness i of the roof section 11 (FIG. 3). The imaginary line 31 therefore lies on the underside 27 or below the underside 27 of the roof section 11. The distance k is advantageously greater than the maximum thickness i by at least 0.8 mm.

A first point of intersection 32, which is the point of intersection between the upper edge 28 and the cutting surface 20, is marked in the side view shown in FIG. 4. A second point of intersection 33 is the point of intersection between the cutting surface 20 and the imaginary line 31. The two points of intersection 32 and 33 are connected in FIG. 4 by a first, imaginary connecting line 36. The first connecting line 36, in the embodiment, is located fully in the cutting surface 20. It can also be provided that the cutting surface 20 extends in a curved manner such that the first connecting line 36 is not located fully in the cutting surface 20. The first connecting line 36 specifies the inclination of the cutting tooth 7 in the region of the roof section 11 in a precise or approximate manner.

As a result of resharpening the cutting tooth 7, the cutting surface 20 is moved relative to the basic body 26 of the cutting member 3 parallel to the contact surface 15 and along the extension of the contact surface 15. The displaced cutting surface 20 is shown in FIG. 4 with a broken line as an imaginary displacement 44. The imaginary displacement 44 shown in FIG. 4 corresponds to a length of the cutting tooth 7 where the tooth tip 14' of the imaginary displacement 44 lies along the longitudinal center axis 18 of the rear bearing point 17 in a top view perpendicularly to the bearing point plane 19. On account of the perspective representation, the longitudinal center axis 18 does not lie perpendicularly to the sheet plane in FIG. 4. The actual arrangement can be seen in the top view in FIG. 7. In the side view shown, a third point of intersection 34 is the point of intersection between the displacement 44 and the upper edge 28 and a fourth point of intersection 35 is the point of intersection between the displacement 44 and the imaginary line 31. The points of intersection 34 and 35 are connected together by a second imaginary connecting line 37. As a result of both the second point of intersection 33 and the fourth point of intersection 35 being located on the same second cutting surface section 23 (FIG. 3) and the second cutting surface section 23 being realized in a flat manner, the connecting lines 36 and 37 extend parallel to one another. In the embodiment, the distance k is chosen such that the fourth point of intersection 35 lies on the displaced cutting surface edge 24'. The cutting surface edge 24 is moved parallel to the contact surface 15 during resharpening. If the distance k is chosen to be greater, the connecting lines 36 and 37 are no longer parallel to one another as the second point of intersection 33 lies in the second cutting surface section 23 and the fourth point of intersection 35 creeps into the first cutting surface section 22 during resharpening and, as a result, the second connecting line 37 has a steeper progression than the first connecting line 36.

Figure 5:
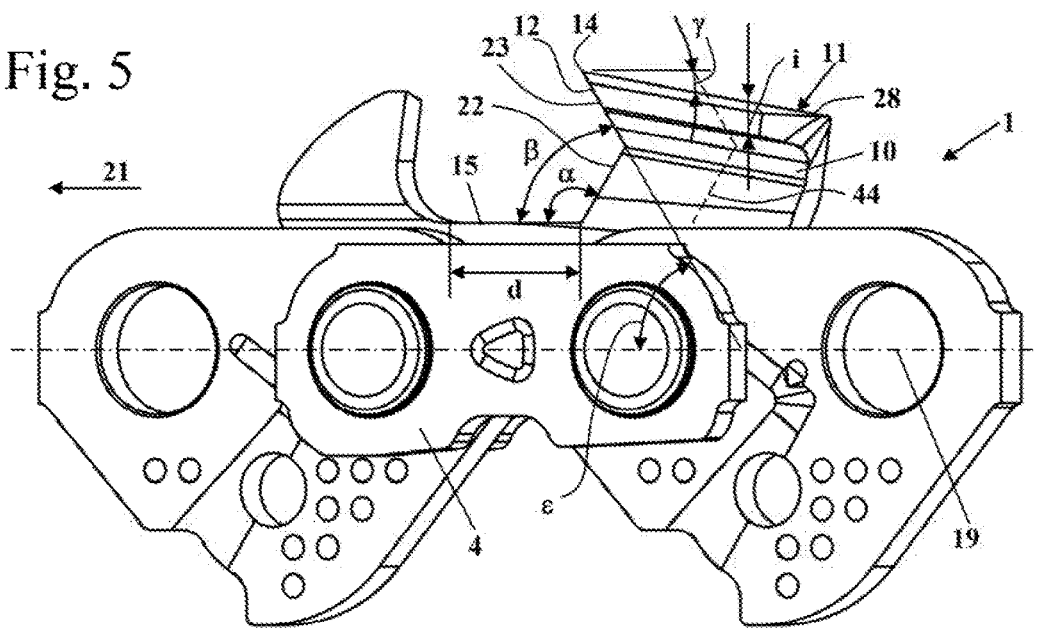

FIG. 5 shows a perspective representation of the section of the saw chain 1 in the sharpening direction 29 from the oppositely situated side of the saw chain 1. In the view, the connecting member 4 lies in front of the cutting member 3 in the viewing direction. As shown in FIG. 5, the first cutting surface section 22, which is realized fully on the side section 10 of the cutting tooth 7, encloses an angle α with the contact surface 15. The angle α is greater than 90°. An angle α between 100° and 160°, in particular between 110° and 140°, preferably of approximately 120°, is provided in the embodiment. The contact surface 15 encloses with the second cutting surface section 23, on which the tooth tip 14 is arranged, an angle β which is smaller than 90°. The angle β is advantageously between 20° and 80°, in particular between 40° and 70°, in a preferred manner is approximately 60°. An undercut is formed on the cutting tooth 7 by the angles α and β. The region of the cutting surface 20 which is located the furthest back in the running direction 21 lies between the second cutting edge 13 and the contact surface 15. As a result, it is possible to achieve both a sufficiently wide connection between the cutting tooth 7 and the tooth root 25 (FIG. 1) and a favorable cutting angle ε. In the embodiment, the contact surface 15 is aligned parallel to the bearing point plane 19. The second cutting surface section 23 encloses with the bearing point plane 19 the cutting angle ε which corresponds to the angle β. The cutting angle ε is advantageously configured for good metal cutting and chip removal. The cutting angle ε corresponds to the angle which the connecting lines 36 or 37 enclose with the bearing point plane 19 as, in the embodiment, the connecting lines 36 and 37 lie fully in the second cutting surface section 23. In the first cutting surface section 22, the cutting surface 20 has a normal which, with the contact surface 15 and the bearing point plane 19, encloses an angle which differs from 0° and from 90°. Correspondingly, the second cutting surface section 23 has a normal which, with the contact surface 15 and the bearing point plane 19, encloses an angle which differs from 0° and from 90°.

As shown in FIG. 5, the upper edge 28 is also inclined with respect to the running direction 21. The upper edge 28 encloses with the running direction 21 a free angle γ which is marked in FIG. 5 with a parallel line with respect to the running direction 21. The free angle γ is advantageously at least 3°, in particular at least 5°. As FIG. 5 also shows, the contact surface 15 in the embodiment has a length d measured in the running direction 21

Figure 6:
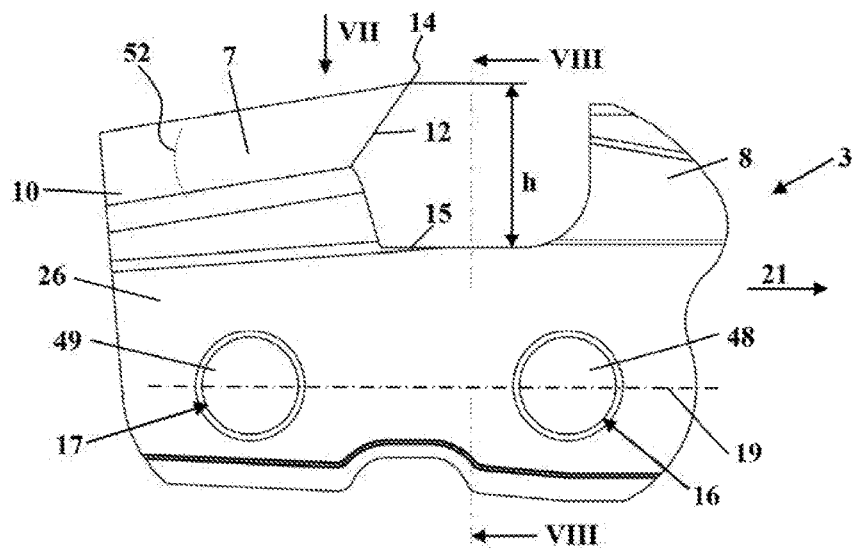
FIG. 6 shows a side view of the cutting member of the saw chain.

FIG. 6 shows a side view of the cutting member 3. As shown in FIG. 6, the basic body 26 of the cutting member 3 has a front bearing point 48 and a rear bearing point 49, which are realized in the embodiment as openings for the connecting pins 5. However, another connection between the cutting member 3 and adjacent the leading trailing drive links 2 and connecting members 4 can also be advantageous.

As FIG. 6 also shows, the cutting tooth 7 has a height h which is measured from the tooth tip 14 to the contact surface 15 and perpendicularly to the bearing point plane 19. A marking 52, which shows the position of the cutting surface 20 in the maximum re-sharpened state of the cutting member 3, can be seen on the side section 10 and on the roof section 11 in FIGS. 6 and 7.

Figure 11:
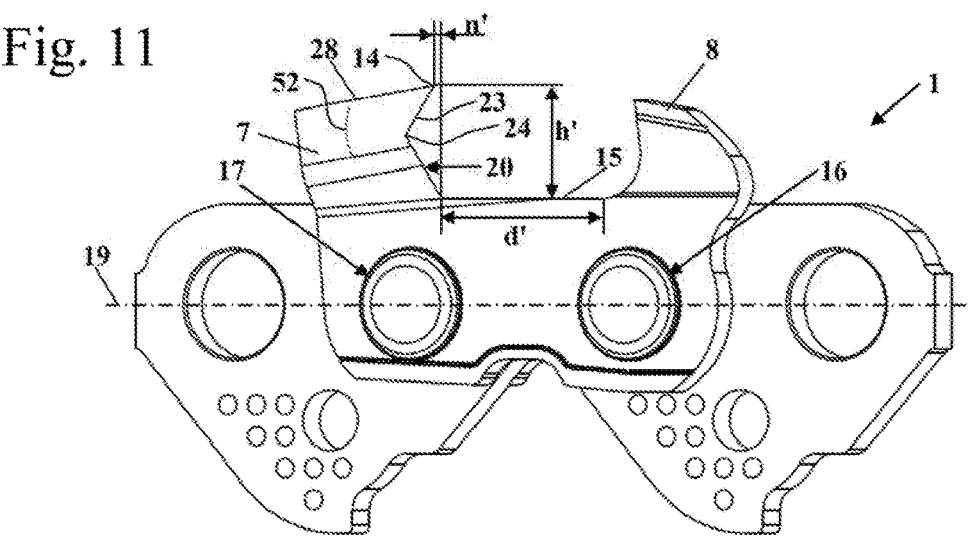
FIGS. 11 and 12 show perspective representations when looking in the sharpening direction in a first resharpening state of the section of the saw chain.

As shown in FIG. 7, the cutting edge 13 in the non-re-sharpened state lies behind the contact surface 15 in the running direction 21. The cutting edge 13, in this case, lies in a top view perpendicularly to the bearing point plane 19, as shown in FIG. 7, in each region behind the section of the contact surface 15 leading in each case in the running direction. In the side view shown in FIG. 6, the tooth tip 14 lies above the contact surface 15, however, as shown in FIG. 7, offset laterally thereto. The second cutting edge 13 is at a distance n to the contact surface 15, measured in the viewing direction perpendicularly to the bearing point plane 19 and perpendicularly to the cutting edge 13. The distance n is produced in a side view in the sharpening direction 29 as a distance, measured parallel to the bearing point plane 19, between the tooth tip 14 and the contact surface 15. The distance n is comparatively small and at each point of the cutting edge 13 is advantageously no more than a third, in particular no more than a quarter of the height h of the cutting tooth 7. In the resharpening state, the distance n is advantageously no more than a third, in particular no more than a quarter of the current height h of the cutting tooth 7. The height h of the cutting tooth 7 is reduced by the free angle γ (FIG. 5) as the degree of resharpening increases, and the distance n is increased. The height h' and the distance n' for the resharpening state shown in FIG. 11 is marked in FIG. 11. In the non-re-sharpened initial state, the distance n is advantageously less than 10% of the tooth height h. In the fully resharpened state, the distance n is advantageously between 15% and 30%, in particular between 20% and 25% of the tooth height h.

FIG. 7 shows the position of the tooth tip 14' in the imaginary displacement 44 of the cutting surface 20. As shown in FIG. 7, the tooth tip 14' of the imaginary displacement 44 lies on the longitudinal center axis 18 of the rear bearing point 17 in the top view perpendicularly to the bearing point plane 19.

Figure 8:
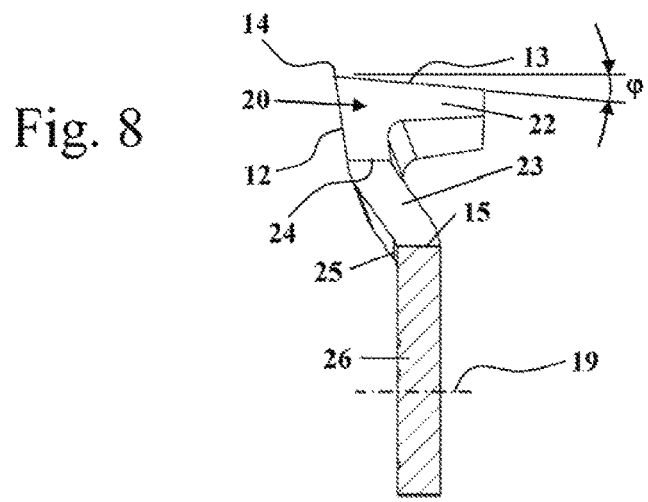
FIG. 8 shows a section along the line VIII-VIII in FIG. 6.

FIG. 8 shows the alignment of the cutting surface edge 24 and of the contact surface 15 parallel to the bearing point plane 19 looking in the running direction 21. As is also shown in FIG. 8, the cutting edge 13 extends at an angle φ to the bearing point plane 19 looking in the running direction 21. The angle φ is advantageously greater than 2°, in particular greater than 5°. The angle φ is advantageously less than 20°. The distance between the cutting edge 13 and the bearing point plane 19, in this case, reduces as the distance from the tooth tip 14 increases.

Figure 9:
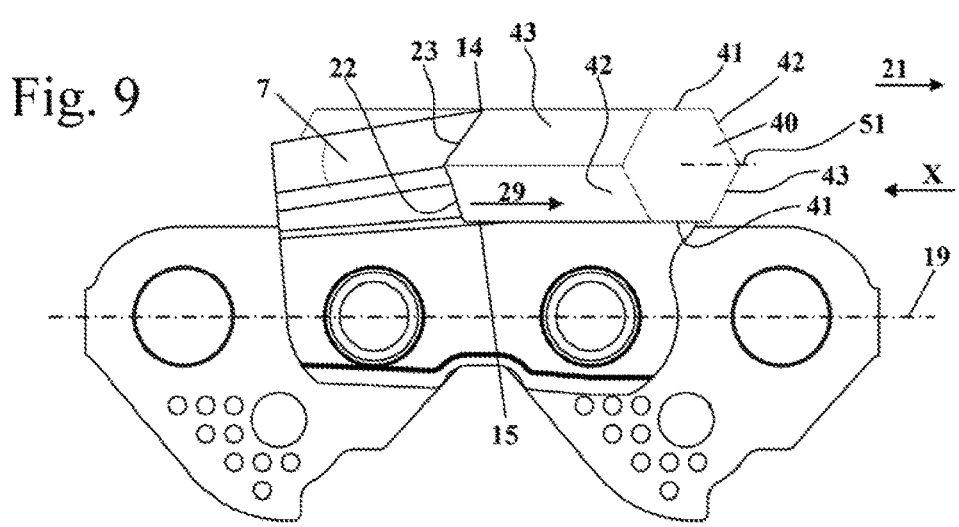
FIG. 9 shows a side view of the detail of the saw chain with a file arranged thereon.
Figure 10:
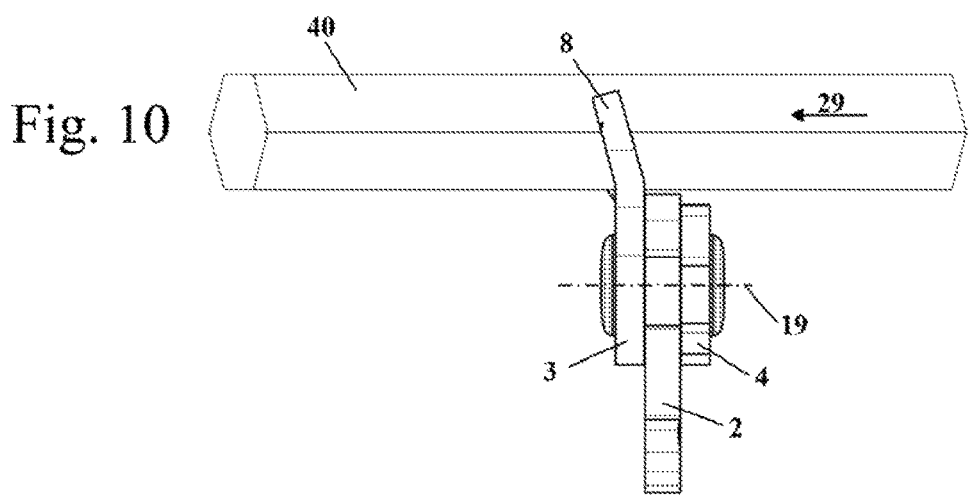
FIG. 10 shows a side view in the direction of the arrow X in FIG. 9.

FIGS. 9 and 10 show a schematic representation of a file 40 for resharpening the cutting member 3 on the chain saw 1. The file 40 has a cross section in the form of a regular hexagon. In the side views shown, the sharpening direction 29 runs parallel to the bearing point plane 19. However, the sharpening direction 29 is at an angle in relation to the sheet plane (see FIG. 7). As shown in FIG. 9, the file 40 has a longitudinal center axis 51 which is aligned in the sharpening direction 29. The file 40 has two unhewn guide surfaces 41 which are located opposite one another, two first file surfaces 42 which adjoin a guide surface 41 in each case in the circumferential direction and are located opposite one another and two second file surfaces 43 which adjoin the first file surfaces in the circumferential direction. A guide surface 41 adjoins each of the second file surfaces 43 on the side located away from the first file surface 42. The guide surfaces 41 are provided for support on the contact surface 15. The first file surfaces 42 are provided for filing the first cutting surface section 22 and the second file surfaces 43 are provided for filing the second cutting surface section 23. The file 40 can be placed on the contact surface 15 in two positions, which are rotated about the longitudinal center axis 51 relative to one another by 180° and are used for filing.

As shown in FIG. 9, in the non-re-sharpened state of the cutting tooth 7, the file 40 extends in the direction perpendicularly to the contact surface 15 at least to the tooth tip 14. The file 40 extends in the height direction from the contact surface 15 at least to the tooth tip 14. The file 40 extends over the entire height h (FIG. 6) of the cutting tooth 7. In the embodiment, the contact surface 15 is aligned parallel to the bearing point plane 19. During resharpening the file 40 is consequently guided in the opposite direction to the running direction 21 and parallel to the bearing point plane 19. The file 40 is guided on the contact surface 15 in an opposite direction to the running direction 21. The file 40 is moved back and forth along its longitudinal center axis 51 on the contact surface 15 and at the same time is pressed and guided against the cutting surface 20 (FIG. 8) in the opposite direction to the running direction 21. As a result of the file surface 42 directly adjoining the unhewn guide surface 41, the cutting surface section 22 is re-sharpened up to the contact surface 15 and the file 40 can be guided along the contact surface 15. As a result of the file 40 being guided along the contact surface 15, the contact surface 15 is extended during resharpening of the cutting surface 20 (FIG. 8). As a result of the guide surface 41 not being smooth, the contact surface 15 is not re-sharpened such that the length and alignment of the contact surface 15 is maintained. This makes simple resharpening itself possible for an inexperienced user. The user has simply to ensure the file 40 bears against the contact surface 15 and the cutting face 20. The user places the file 40 onto the contact surface 15 and moves the file 40 in the sharpening direction 29 on the contact surface 15. Lifting the file 40 from the contact surface 15 or the file 40 tilting in relation to the contact surface 15 is not provided during resharpening.

Figure 12:
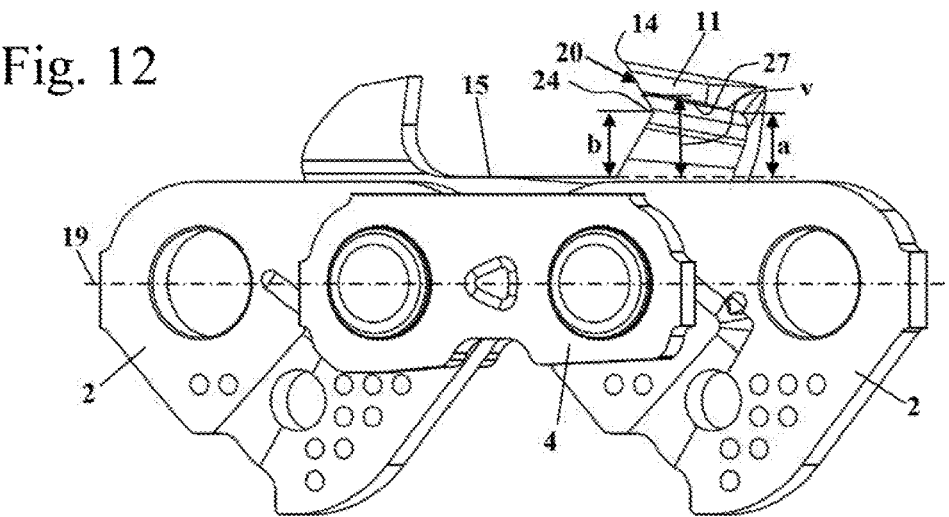
Figure 13:
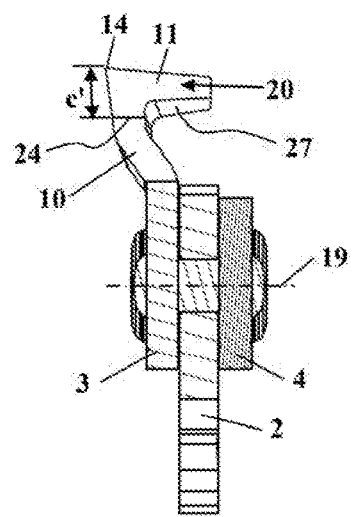
FIG. 13 shows a sectional representation of the saw chain in the resharpening state shown in FIGS. 11 and 12 along the line III-III in FIG. 1.

FIGS. 11 to 13 show the saw chain 1 in a first resharpening state in which the contact surface has a length d' which is greater than the length d. On account of the inclination of the upper edge 28 of the roof section 11, the distance between the tooth tip 14 and the bearing point plane 19 has reduced as a result of the resharpening. The distance between the cutting surface edge 24 and the bearing point plane 19 is unchanged such that the height of the second cutting surface section 23 has decreased during resharpening. The first cutting surface section 22 is unchanged in length and alignment. Simply the position with reference to the bearing points 16 and 17 has changed.

As shown in FIG. 12, the underside 27 of the roof section 11 is at a smallest angle a, measured perpendicularly to the bearing point plane 19, with respect to the contact surface 15. In the resharpening state shown, the underside 27 on the cutting surface 20 is at a distance v from the contact surface which is greater than the distance b.

As shown in FIG. 13, the cutting surface edge 24 in the resharpening state shown lies below the underside 27 of the roof section 11, that is, at a smaller distance from the bearing point plane 19 than the underside 27. The cutting surface edge 24 and the underside 27, in this case, are arranged laterally offset to one another. In the resharpening state shown, the cutting surface edge 24 is situated fully in the side section 10 of the cutting member 3. The distance between the tooth tip 14 and the cutting surface edge 24 has reduced to the distance c' which is smaller than the distance c in the non-re-sharpened state (FIG. 2).

Figure 14:
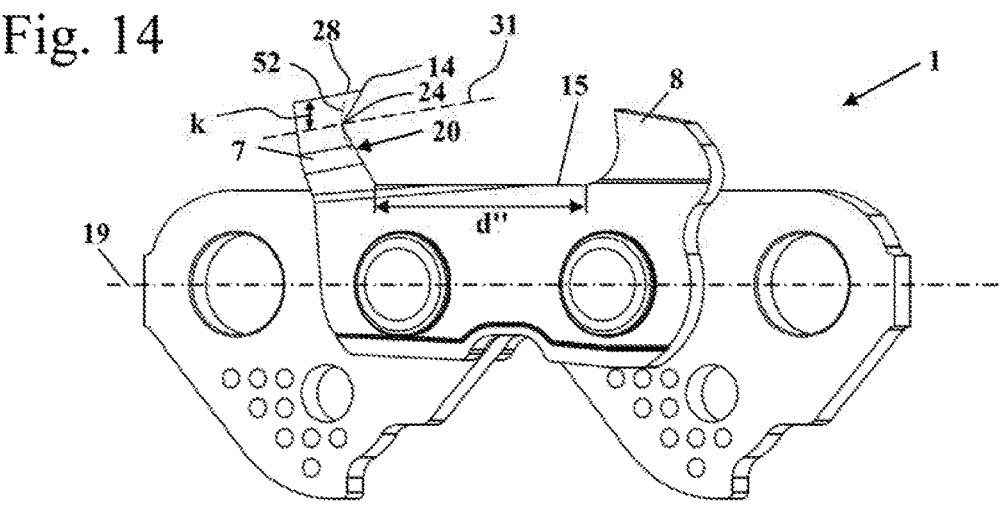
FIGS. 14 and 15 show perspective representations of the section of the saw chain when looking in the sharpening direction in a second resharpening state.
Figure 15:
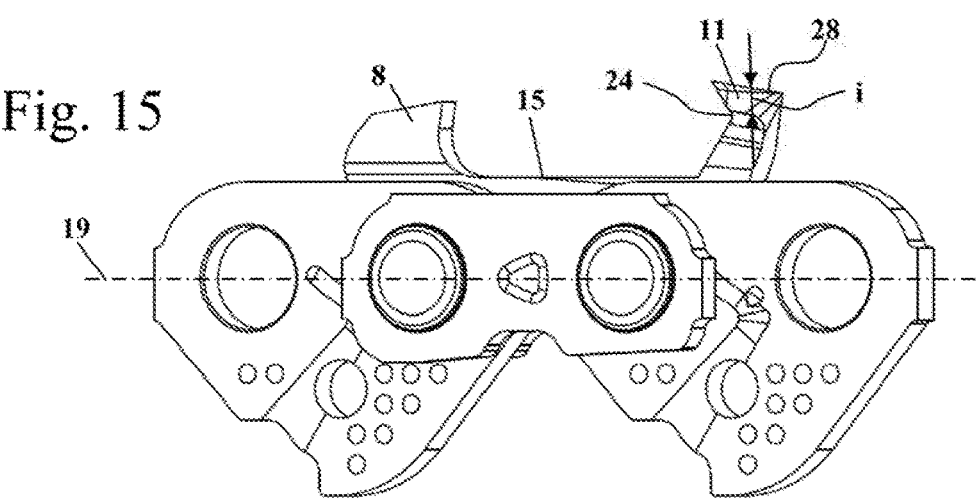
Figure 16:
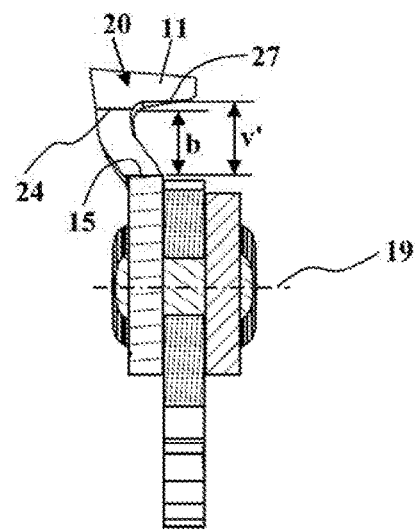
FIG. 16 shows a section through the saw chain in the resharpening state from FIGS. 14 and 15 in a section along the line III-III in FIG. 1.

FIGS. 14 to 16 show the saw chain 1 in the fully re-sharpened state of the cutting tooth 7. The fully re-sharpened state, in this case, is advantageously the state in which the remainder of the cutting tooth 7 is dimensioned in a barely sufficient manner to absorb the cutting forces occurring. The cutting surface 20 projects up to the marking 52. The imaginary line 31 and the distance k are also marked in FIG. 14. As FIGS. 14 and 15 show, the distance k is chosen such that the distance k is greater than the thickness i of the roof section 11 even in the fully re-sharpened state. The amount of the distance k corresponds to the distance, measured perpendicularly to the bearing plane 19, between the cutting surface edge 24 and the upper edge 28 of the roof section 11 in the fully re-sharpened state. The contact surface 15 has a length d″ which is greater than the length d′ and the length d. As shown in FIG. 16, the distance b between the cutting surface edge 24 and the contact surface 15 is also smaller in the resharpening state than the distance v′ between the underside 27 of the roof section 11 on the cutting surface 20 and the contact surface 15. The cutting surface edge 24 therefore lies below the roof section 11. The distance has reduced relative to the resharpening state from FIGS. 11 to 13 from the distance v to the distance v′. In the fully re-sharpened state, it can be expedient for the distance v′ to correspond to the distance b such that the cutting surface edge 24 lies at the height of the underside 27 of the roof section 11. The cutting surface edge 24, in a preferred realization, lies at a distance from the roof section 11 in all admissible resharpening states.

Figure 17:
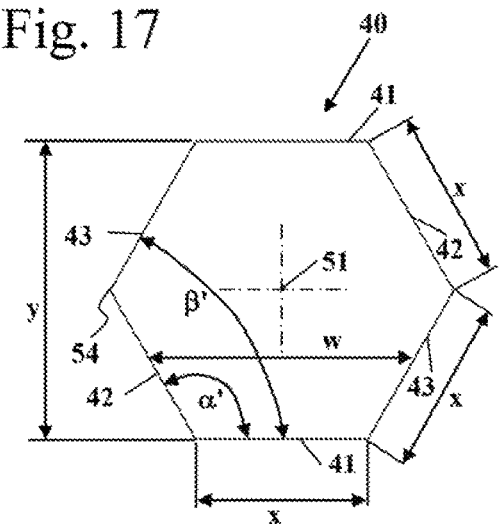
FIG. 17 shows a schematic cross section of a file for resharpening the cutting member shown in FIGS. 1 to 16.

FIGS. 17 to 20 show embodiments of a file 40 for filing the cutting tooth 7 shown in FIGS. 1 to 16. FIG. 17 shows a file 40, the cross section of which is realized as a regular hexagon. The guide surface 41 has an edge dimension x. In the embodiment, the edge dimension x is the length of the guide surface 41 in a cross section perpendicular to the longitudinal center axis 51. The length of the guide surface 41 can differ from the length of the contact surface 15. In an advantageous manner, in the initial state the contact surface 15 includes a length of at least one third of the length of the guide surface 41. The file surfaces 42 and 43 have the same edge dimension x. The guide surface 41 encloses with the file surface 42, which adjoins in the circumferential direction, an angle α′ which is 60° in the embodiment. The angle α′ is matched to the angle α of the cutting member 3 and is the same size as the angle. The guide surface 41 encloses with the second file surface 43 connecting to the file surface 42 in the circumferential direction a circumferential angle β′ which is 60° in the embodiment. The angle β′ is matched to the angle β of the cutting member 3 and is the same size as the angle. The distance y between the oppositely situated guide surfaces 41 is double the size of the distance b between the cutting surface edge 24 of the cutting member 3 and the support 15. The longitudinal edge 54 between the file surfaces 42 and 43 lies in the cutting surface edge 24 when the file 40 is utilized for resharpening the cutting surface 20.

In the case of the embodiment shown in FIG. 17, two guide surfaces 41 in each case and two file surfaces 42 or 43 in each case are provided such that the file 40 can be used to file the cutting tooth 7 in two positions rotated by 180° about the longitudinal center axis 51. The file 40 has a width w which is measured parallel to the guide surface 41. In a first region, which is connected to the guide surface 41 and extends up to the height of the longitudinal edge 54 and of the longitudinal center axis 51, the width w increases as the distance from the guide surface 41 increases. In a second region which extends from the plane defined by the longitudinal center axis 51 and the longitudinal edges 54 to the side remote from the lower guide surface 41, the width w decreases as the distance from the lower guide surface 41 increases. The longitudinal edge 54 is the region with the greatest width w.

Figure 18:
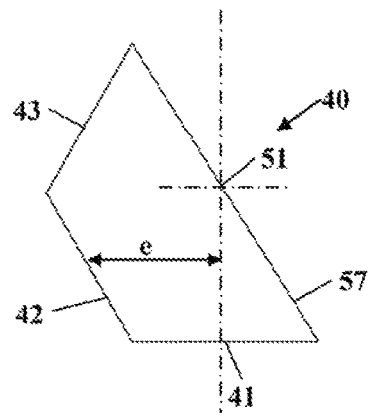
FIGS. 18 to 20 show schematic cross sectional representations of embodiments of files for resharpening a cutting member according to the invention.

FIG. 18 shows an embodiment of a file 40 which only has one guide surface 41, one first file surface 42 and one second file surface 43 which are arranged adjoining one another in the circumferential direction. The dimensions and alignments of the guide surface 41 and of the two file surfaces 42 and 43 correspond in an advantageous manner to those of the embodiment according to FIG. 17. The cross section of the file 40 from FIG. 18 is in the form of half a hexagon. The longitudinal side 57 oppositely situated to the file surface 42 is realized in a planar manner in the embodiment. The longitudinal side 57 is without function and can consequently assume any arbitrary form. The file 40 has a center plane 30 which includes the longitudinal center axis 51 and is aligned perpendicular to the guide surface 41. The distance, measured parallel to the guide surface 41, between the file surface 42 and the center plane increases in the region of the first file surface 42. The distance e between the file surface 43 and the center plane 30 decreases in the region of the second file surface 43 as the distance to the guide surface 41 increases. A geometry of the cutting surface 20 with an undercut is achieved as a result.

Figure 19:
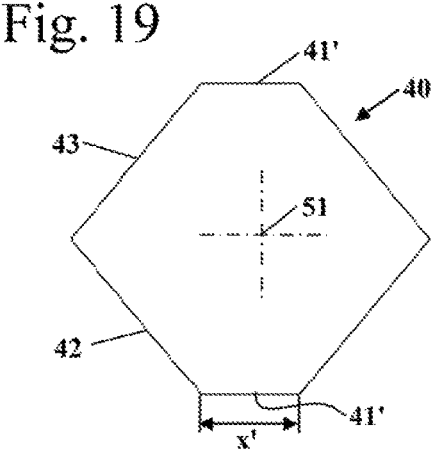
Figure 20:
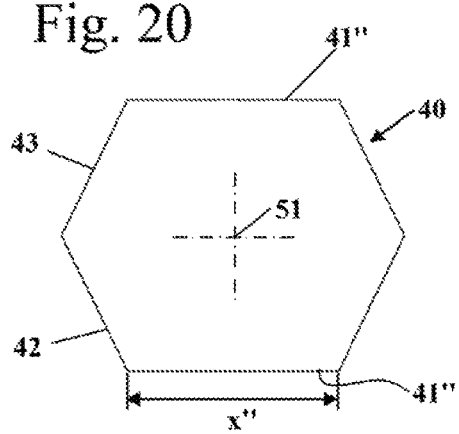

FIG. 19 shows an embodiment of a file 40 where guide surfaces 41 are provided which have a reduced edge dimension x′. The edge dimension x′ is advantageously at least 3 mm. The edge dimension x and the edge dimension x′ for the embodiment from FIG. 20 are also advantageously at least 3 mm in order to achieve sufficient support of the file 40 on the contact surface 15. In the case of the embodiment according to FIG. 20, guide surfaces 41″ are provided which have an enlarged edge dimension x″ compared to the guide surfaces 41 from FIG. 17. Apart from the edge dimension x′ or x″, the files 40 from FIGS. 19 and 20 correspond to the embodiment according to FIG. 17. In particular, the length of the second file surface 42 and the alignment of the second file surface 42 compared to the guide surface 41′ are functionally relevant. The form, length and alignment of the first file surface 42 in relation to the guide surface 41′ can also be chosen to be different to what is shown. The file 40 can, in particular, also be configured in a symmetrical manner. The ratio of the sum of the lengths of the unhewn guide surfaces 41 to the sum of the lengths of the file surfaces 42, 43 is advantageously greater than a quarter, in particular greater than a third, preferably greater than half.

Figure 21:
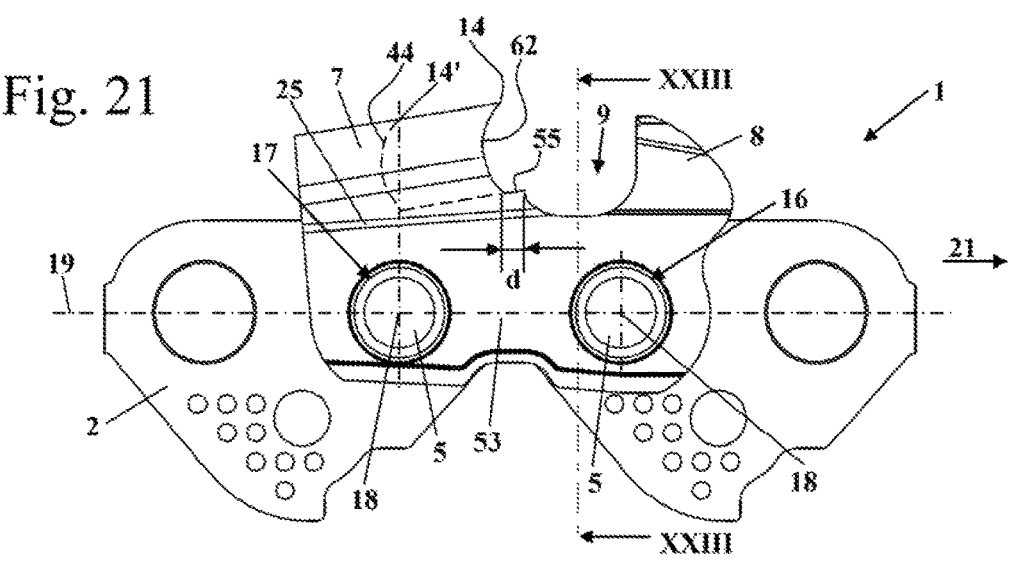
FIGS. 21 and 22 show side views of a section of a further embodiment of a saw chain.

FIGS. 21 to 31 show an embodiment of a saw chain 1 with a cutting member 53. Elements which correspond to one another are designated in all the figures by identical reference signs. The saw chain 1 from FIG. 21 is constructed corresponding to the saw chain 1 from the preceding figures.

The saw chain 1 differs from the preceding embodiment in the configuration of the cutting tooth 7 of the cutting member 53. The cutting tooth 7 has a first cutting edge 62 which, as shown in FIG. 21, extends in a curved manner in contrast to the first cutting edge 12. The first cutting edge 62 is arranged laterally. A contact surface 55 is realized in front of the first cutting edge 62. The contact surface 55 in the embodiment forms a part of the bottom of the cutout 9. However, the contact surface 55 only extends over a section of the bottom of the cutout 9. The length d of the contact surface 55, measured in the running direction 21, is at least 3 mm. During the resharpening operation, the first cutting edge 62 is displaced together with the cutting surface 20 shown in FIG. 22 in the opposite direction to the running direction 21 and parallel to the contact surface 55. FIG. 21 shows an imaginary displacement 44 of the cutting surface 20 where the tooth tip 14' of the imaginary displacement 44 lies perpendicularly to the bearing point plane 19 above the longitudinal center axis 18 of the rear bearing point 17. The displacement is effected, in this case, in extension of the contact surface 55, that is, along a plane in which the contact surface 55 lies.

Figure 22:
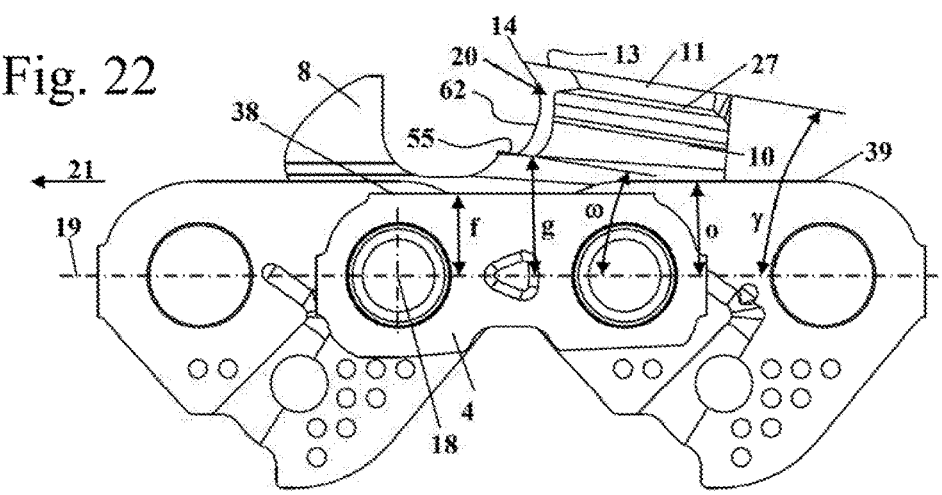

As shown in FIG. 22, the contact surface 55 is inclined by an angle ω with respect to the bearing point plane 19 looking in the direction of the longitudinal center axes 18 of the bearing points 16 and 17. In the embodiment, the angle ω corresponds to the angle γ by which the upper edge 28 is inclined in relation to the bearing point plane 19. The contact surface 55 extends, therefore, parallel to the upper edge 28 of the roof section 11 of the cutting member 53. The angle ω, by which the contact surface 55 is inclined in relation to the bearing point plane 19, is advantageously between 2° and 20°, in particular between 5° and 15°. As is also shown in FIG. 22, the contact surface 55 is at a distance g, measured perpendicularly to the bearing point plane 19, from the bearing point plane 19. The distance g, in this case, is the smallest distance between the contact surface 55 and the bearing point plane 19 and in the embodiment is measured directly adjacent the cutting surface 20 on account of the inclination of the contact surface 55. The distance g is clearly greater than the distance f between the upper side 28 of the adjacent connecting member 4 and the bearing point plane 19. The difference between the distances g and f is advantageously chosen such that the distance g is still greater than the distance f even in the maximum re-sharpened state of the cutting surface 20. The distance g is advantageously also greater than the distance o between the upper side 39 of the drive link 2 and the bearing point plane 19 in the fully re-sharpened state.

Figure 23:
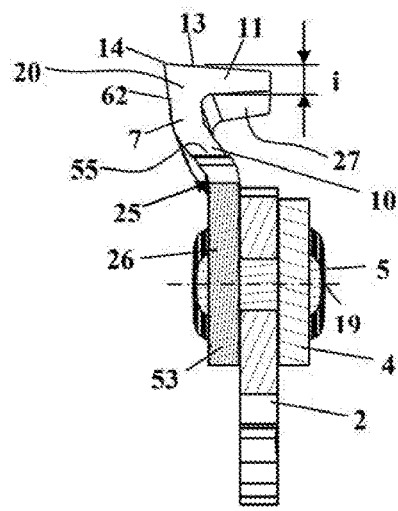
FIG. 23 shows a section along the line XXIII-XXIII in FIG. 21.

As also shown in FIG. 22, the cutting surface 20 extends in a curved manner, whilst the contact surface 55 is realized in a planar manner. The cutting surface 20 is realized as a continuous, curved surface on which both the first cutting edge 62 and the second cutting edge 13 are realized. The cutting surface 20 also extends into the roof section 11. As shown in FIG. 23, the roof section 11 has a maximum thickness i and an underside 27. The cutting tooth 7 is connected to the planar basic body 26 of the cutting member 53 at the tooth root 25, in particular is integrally formed thereon.

Figure 24:
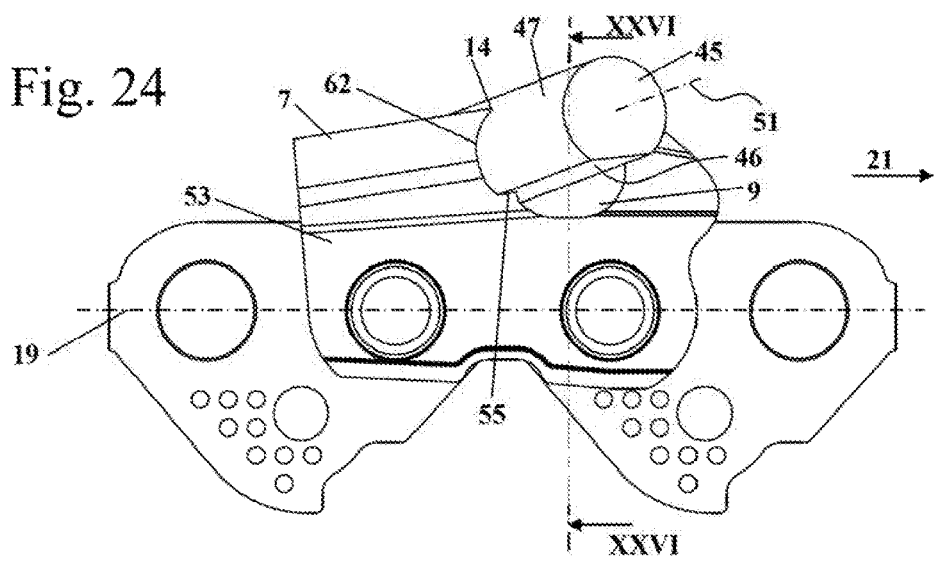
FIGS. 24 and 25 show side views of the section of the further embodiment of a saw chain with a schematically shown file arranged thereon.
Figure 25:
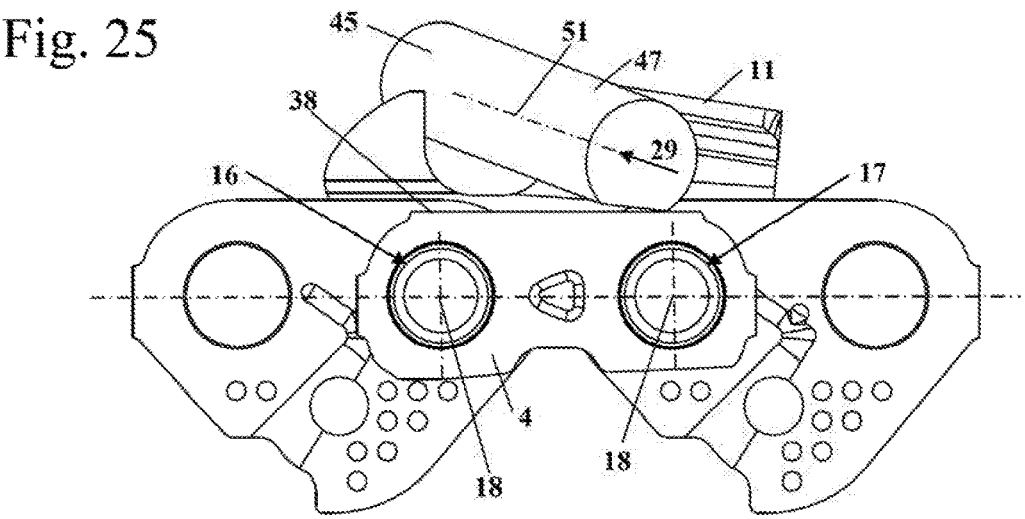
Figure 26:
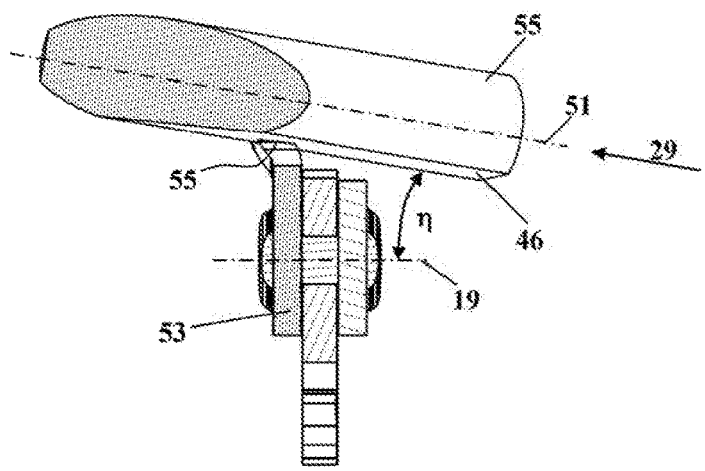
FIG. 26 shows a section along the line XXVI-XXVI in FIG. 24.

FIGS. 24 to 26 show a file 45 for resharpening the cutting member 53 on the cutting member 53. During resharpening, the file 45 is aligned in a resharpening direction 29 with its longitudinal center axis 51. As shown in FIGS. 24 to 26, the resharpening direction 29 is inclined with respect to the bearing point plane 19 and to the running direction 21.

The file 45 is realized as a round file with a flattened side. A guide surface 46, on which the file 45 is not smooth, is realized on the flattening. A curved file surface 47, which has an arcuate cross section in the embodiment and connects the two longitudinal sides of the guide surface 46 to one another, connects to the planar guide surface 46. On the file surface 47, the file 45 has teeth for machining which engage the cutting surface 20. The file 45 rests on the contact surface 55 with the guide surface 46. As shown in FIG. 26, when looking in opposite direction to the running direction 21, the guide surface 46 encloses an angle η with the bearing point plane 19 which is advantageously between 2° and 10°, in particular between 3° and 8°. The angle η is approximately 5° in the embodiment. The inclination of the guide surface 46 corresponds to the inclination of the contact surface 55 in the transverse direction of the cutting member 53 shown in FIG. 26. The contact surface 55 extends, therefore, neither looking in the running direction 21 nor looking in the direction of the longitudinal center axis 18 of the bearing points 16 and 17, parallel to the bearing point plane 19. As a result of the specified spatial orientation of the contact surface 55, correct alignment of the file 45 with respect to the cutting tooth 7 in at least one direction in space is made possible for the user. Furthermore, the distance at which the file is to be moved above the bearing point plane 19 is specified for the user so that a constant cutting angle is ensured and weakening of the basic body 26 of the cutting member 53 is avoided.

Figure 27:
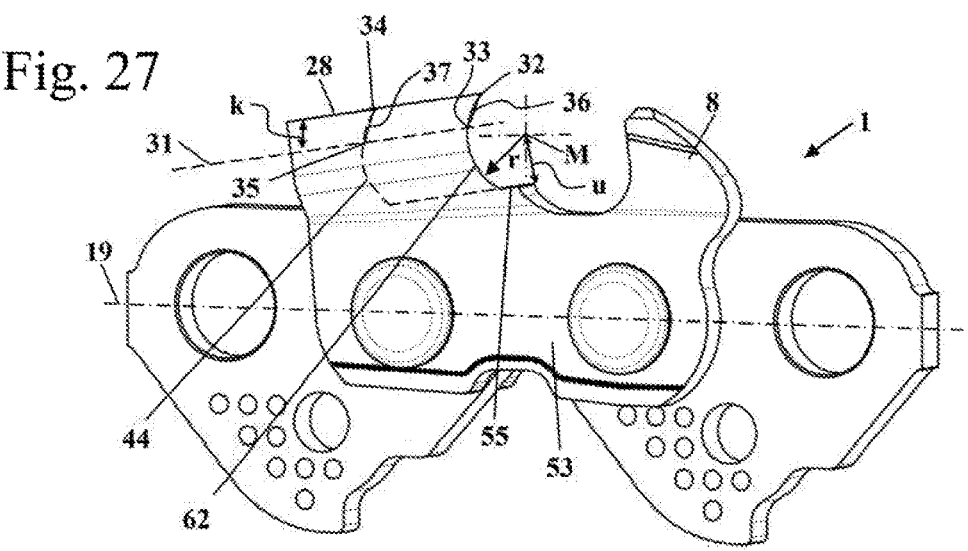
FIG. 27 shows a perspective representation of the section of the saw chain from FIGS. 21 to 23 when looking in the sharpening direction.

FIG. 27 shows a perspective representation of the saw chain 1 looking in the resharpening direction 29. In the viewing direction, the cutting edge 62 coincides with the cutting surface 20. FIG. 27 also marks the imaginary displacement 44 of the cutting surface 20 or of the cutting edge 62. In the viewing direction, the cutting edge 62 extends as a circular arc about a center point M at a radius r. The contact surface 55 is at a distance u, measured perpendicularly to the contact surface 55, from the center point M. The distance u is advantageously smaller than the radius r. The contact surface 55, in this case, is arranged closer to the bearing point plane 19 than the center point M. The cutting edge 62 has a first point of intersection 32 which is the point of intersection between the cutting edge 62 and the upper edge 28 of the roof section 11. A second point of intersection 33 is the point of intersection between an imaginary line 31 and the cutting edge 62. The imaginary line 31 is at a distance k from the upper edge 28 which is greater than the maximum thickness i of the roof section 11. The points of intersection 32 and 33 are connected by an imaginary connecting line 36. Correspondingly, a third point of intersection 34 on the imaginary displacement 44 is the point of intersection between the imaginary displacement 44 and the upper edge 28 and a fourth point of intersection 35 is the point of intersection between the imaginary displacement 44 and the imaginary line 31. The third point of intersection 34 and the fourth point of intersection 35 are connected to a connecting line 37. The connecting lines 36 and 37 extend parallel to one another. The parallelity of the connecting lines 36 and 37 is produced as a result of the contact surface 55 extending parallel to the upper edge 28. The region between the points of intersection 32 and 33 is filed by the same circumferential section of the file 45 as the region between the points of intersection 34 and 35 in the corresponding resharpening state. As a result, the connecting lines 36 and 37 achieve the same inclination. In the region between the points of intersection 32 and 33, the cutting surface 20 has normals which enclose angles, which differ from 0° and 90°, with the contact surface 55 and the bearing point plane 19. In the region of the cutting surface 20 which is closer to the bearing point plane 19 than the center point M, the cutting surface 20 has further normals which enclose angles, which differ from 0° and 90°, with the contact surface 55 and the bearing point plane 19. A normal on the cutting surface 20 which extends parallel to the bearing point plane 19 is given between the two regions.

Figure 28:
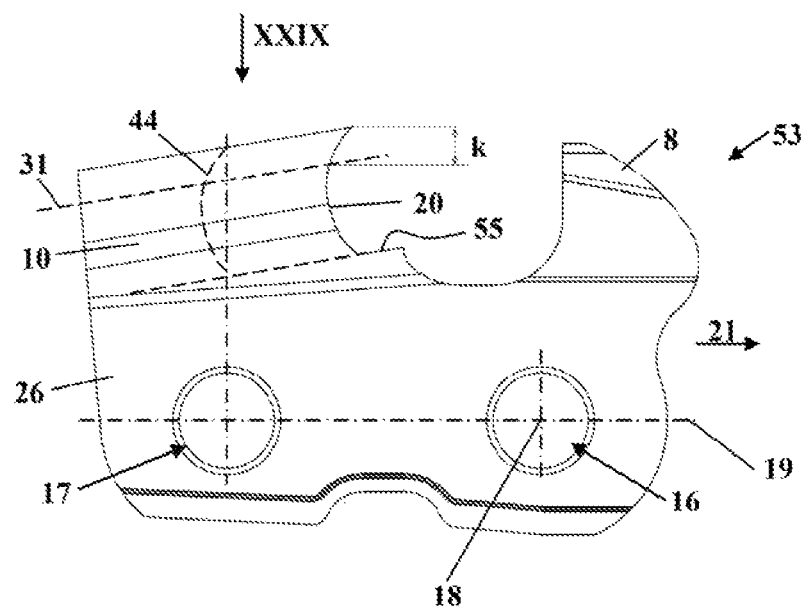
FIG. 28 shows a side view of the cutting member of the saw chain from FIGS. 21 to 27.

FIG. 28 shows a side view of the cutting member 53 looking in the direction of the longitudinal center axes 18 of the bearing points 16 and 17. In the case of a saw chain 1, the chain links of which are connected via connecting pins 5, the longitudinal center axis 18 is the longitudinal center axis of the connecting pins 5.

Figure 29:
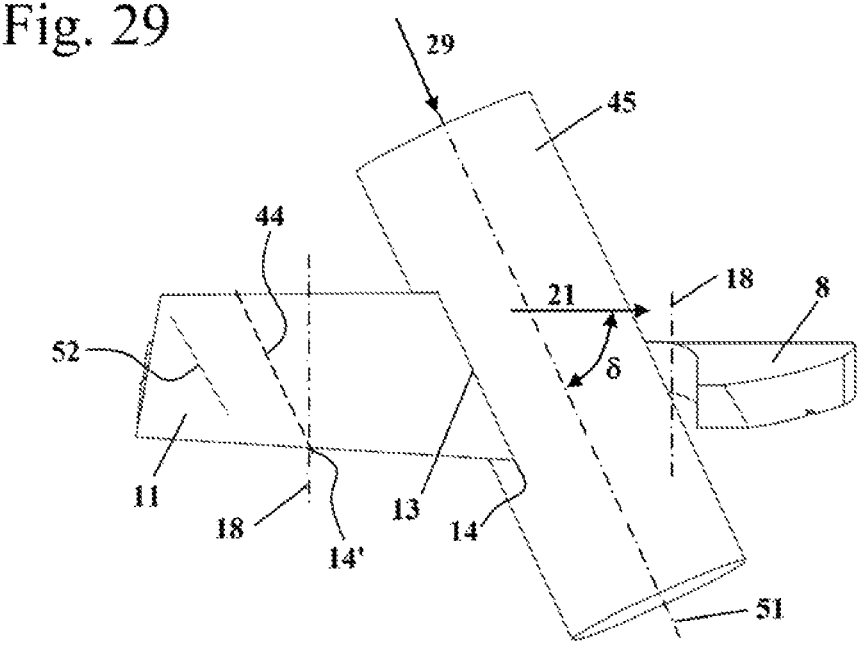
FIG. 29 shows a top view of the cutting member from FIG. 28 in the direction of the arrow XXIX in FIG. 28 with a schematically shown file for resharpening.

FIG. 29 shows the alignment of the sharpening direction 29. The sharpening direction 29 encloses an angle δ with the running direction 21. FIG. 29 also shows the arrangement of the imaginary displacement 44 where the tooth tip 14' of the imaginary displacement 44 is arranged perpendicularly to the bearing point plane 19 above the longitudinal center axis 18 of the rear bearing point 17. As FIG. 29 also shows, the marking 52 is at a distance from the imaginary displacement 44. The cutting tooth 7 is therefore able to be re-sharpened still further when the cutting surface 20 is situated on the imaginary displacement 44.

Figure 30:
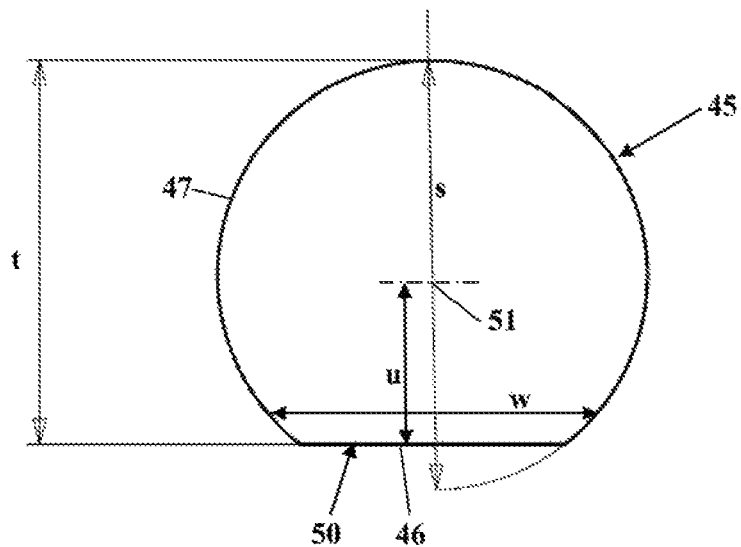
FIG. 30 shows a schematic cross sectional representation of an embodiment of a file for resharpening the cutting member; and, FIG. 31 shows a side view of the cutting member from FIG. 28 in the fully re-sharpened state.

FIG. 30 shows a schematic cross section of the file 45. On the file surface 47, the file 45 has a diameter s which corresponds to double the radius r of the cutting edge 62 (FIG. 27). The file 45 has a flattening 50 on which the guide surface 46, which is not smooth, is realized. On the flattening 50, the file 45 has a reduced height t which is smaller than the diameter s. The distance between the longitudinal center axis 51 and the flattening 50 corresponds to the distance u between the contact surface 55 and the center point M which is also marked schematically in FIG. 30. The center point M corresponds to the center point of the circle on which the file surface 47 lies. The guide surface 46 extends advantageously over at least one sixth of the circumference of the file 45. The file 45 has a width w which is measured parallel to the guide surface 46 and which increases as the distance from the guide surface 46 increases. As a result, an undercut is generated on the cutting surface 20. The file surface 47 extends in the embodiment over a circumferential angle of more than 270° about the center point M and connects directly to both longitudinal sides of the guide surface 46. In an expedient manner, a file 45 can also be formed only by a segment of the file 45 shown in FIG. 30 such that the arcuate file surface 47 does not merge directly into the planar guide surface 46 at least on one longitudinal side.

Figure 31:
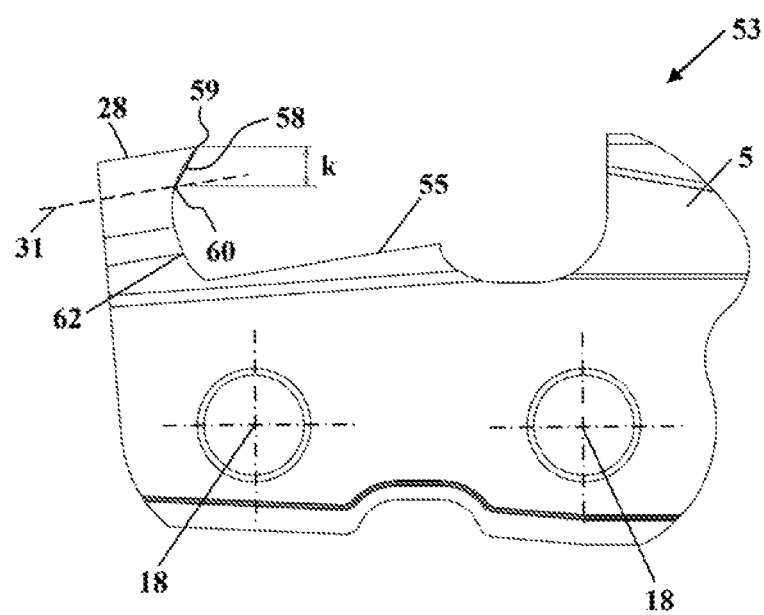

FIG. 31 shows the cutting member 53 in the fully re-sharpened state. A connecting line 58, which is shown schematically in FIG. 31 and connects a fifth point of intersection 59 of the cutting edge 62 with the upper edge 28 of the roof section 11 to a sixth point of intersection of the cutting edge 62 with the imaginary line 31, lies parallel to the connecting lines 36 and 37 (FIG. 27) even in the fully re-sharpened state. The connecting line 58, in this case, is actually to be shown looking in the sharpening direction 29 and is only shown schematically in FIG. 31.

In an alternative realization, the contact surface 15, 55 can be formed by only part of the bottom which delimits the cutout 9. In a further alternative configuration, the contact surface 15 can be inclined by an angle η (FIG. 26) with respect to the bearing point plane 19 when looking in the running direction 21. Further advantageous embodiments are produced by arbitrary combinations of individual features of the above-described embodiments.

It is understood that the foregoing description is that of the preferred embodiments of the invention and that various changes and modifications may be made thereto without departing from the spirit and scope of the invention as defined in the appended claims.

What is claimed is:

1. A cutting member of a saw chain, the cutting member comprising:
   a cutting tooth;
   the cutting member defining a running direction and having a forward bearing point disposed at a forward position with respect to the running direction and a rearward bearing point disposed at a rearward position with respect to the running direction;
   a sharpened cutting surface at which at least one cutting edge is formed;
   a planar contact surface adjoining said cutting surface;
   said cutting tooth having a roof section at which one of said at least one cutting edges is formed;
   said roof section, when viewed in a side view of the cutting member with a viewing direction in a sharpening direction which runs parallel to said cutting surface and parallel to said contact surface, having a greatest thickness (i) measured perpendicular to the running direction;
   said roof section having an upper edge;
   the cutting member defining a first connecting line in said side view connecting a first point of intersection between said upper edge of said roof section and said cutting surface to a point of intersection between an imaginary line, which extends parallel to and at a distance (k) from said upper edge of said roof section, and said cutting surface;
   said cutting tooth having a tooth tip;
   the cutting member defining a second connecting line in said side view connecting a second point of intersection between said upper edge of said roof section and an imaginary displacement of said cutting surface parallel to said contact surface at a position in which said tooth tip lies perpendicular to the running direction above a longitudinal center axis of the rear bearing point, to a third point of intersection between said imaginary line and said imaginary displacement of said cutting surface; and,
   said contact surface being aligned such that said first connecting line and said second connecting line run parallel to each other.

2. The cutting member of claim 1, wherein said distance (k) is at least 0.8 millimeters greater than said greatest thickness (i) of said roof section.

3. The cutting member of claim 1, wherein said contact surface has a length (d) of at least 3 mm measured in the running direction.

4. The cutting member of claim 1, wherein:
   said sharpened cutting surface has a first cutting surface section and a second cutting surface section extending at an angle to said first cutting surface section;
   said second cutting surface section is at least partially formed at said roof section; and,
   said first cutting surface section and said second cutting surface section adjoin each other at a cutting surface edge.

5. The cutting member of claim 3, wherein:
   said forward bearing point and said rearward bearing point each define a respective longitudinal center axis;
   said longitudinal center axes span a bearing point plane; and, said contact surface and said bearing point plane conjointly enclose an angle of less than 5° in said side view.

6. The cutting member of claim 1, wherein said at least one cutting edge extends in an arc-shaped manner.

7. The cutting member of claim 1, wherein:
said at least one cutting edge extends in an arc-shaped manner with a radius (r) about a center point (M);
said contact surface and said center point (M) define a distance (u) between each other; and,
said distance (u) is less than said radius (r).

8. The cutting member of claim 6, wherein said contact surface and said upper edge of said roof section conjointly enclose an angle of less than 5° in said side view.

9. The cutting member of claim 1, wherein:
said forward bearing point and said rearward bearing point each define a respective longitudinal center axis; and,
said longitudinal center axis of said forward bearing point and said longitudinal center axis of said rearward bearing point conjointly define a bearing point plane.

10. The cutting member of claim 9, wherein said first connecting line and said bearing point plane conjointly define an angle (ε) of less than 90° measured at a side facing away from said roof section.

11. The cutting member of claim 9, wherein said contact surface and said bearing point plane conjointly define an angle of less than 5° in a viewing direction in the running direction.

12. The cutting member of claim 9 further comprising:
a depth delimiter arranged ahead of said cutting tooth with respect to the running direction;
the cutting member defining a cutout between said cutting tooth and said depth delimiter; and,
said cutout being at least partially delimited by said contact surface in a direction toward said bearing point plane.

13. A saw chain comprising:
a cutting member having a cutting tooth;
said cutting member defining a running direction and having a forward bearing point disposed at a forward position with respect to the running direction and a rearward bearing point disposed at a rearward position with respect to the running direction;
said cutting member having a sharpened cutting surface at which at least one cutting edge is formed;
said cutting member having a planar contact surface adjoining said cutting surface;
said cutting tooth having a roof section at which one of said at least one cutting edges is formed;
said roof section, when viewed in a side view of the cutting member with a viewing direction in a sharpening direction which runs parallel to said cutting surface and parallel to said contact surface, having a greatest thickness (i) measured perpendicular to the running direction;
said roof section having an upper edge;
said cutting member defining a first connecting line in said side view connecting a first point of intersection between said upper edge of said roof section and said cutting surface to a point of intersection between an imaginary line, which extends parallel to and at a distance (k) from said upper edge of said roof section, and said cutting surface;
said cutting tooth having a tooth tip;
said cutting member defining a second connecting line in said side view connecting a second point of intersection between said upper edge of said roof section and an imaginary displacement of said cutting surface parallel to said contact surface at a position in which said tooth tip lies perpendicular to the running direction above a longitudinal center axis of the rear bearing point, to a third point of intersection between said imaginary line and said imaginary displacement of said cutting surface;
said contact surface being aligned such that said first connecting line and said second connecting line run parallel to each other;
said forward bearing point and said rearward bearing point each defining a respective longitudinal center axis;
said longitudinal axis of said forward bearing point and said longitudinal axis of said rearward bearing point conjointly defining a bearing point plane;
said first connecting line and said bearing point plane conjointly defining an angle (ε) of less than 90° measured at a side facing away from said roof section;
a connecting member having an upper side and arranged adjacent to said cutting member;
said upper side of said connecting member and said bearing point plane defining a distance (f) between each other;
said contact surface and said bearing point plane defining a distance (g) between each other; and,
said distance (f) being smaller than said distance (g).

* * * * *

UNITED STATES PATENT AND TRADEMARK OFFICE
CERTIFICATE OF CORRECTION

PATENT NO. : 10,456,946 B2  
APPLICATION NO. : 15/959103  
DATED : October 29, 2019  
INVENTOR(S) : Lux et al.

Page 1 of 1

It is certified that error appears in the above-identified patent and that said Letters Patent is hereby corrected as shown below:

In the Specification

<u>In Column 6</u>:  
Line 45: delete "rough" and insert -- unhewn -- therefor.

<u>In Column 13</u>:  
Line 6: insert -- and -- after "the leading".

Signed and Sealed this  
Fifth Day of May, 2020

Andrei Iancu  
*Director of the United States Patent and Trademark Office*